(12) United States Patent
Cha et al.

(10) Patent No.: US 8,498,670 B2
(45) Date of Patent: Jul. 30, 2013

(54) MOBILE TERMINAL AND TEXT INPUT METHOD THEREOF

(75) Inventors: Sun-Hwa Cha, Seoul (KR); In-Jik Lee, Seoul (KR); Jae-Do Kwak, Seoul (KR); Jong-Keun Youn, Gunpo (KR)

(73) Assignee: LG Electronics Inc., Seoul (KR)

( * ) Notice: Subject to any disclaimer, the term of this patent is extended or adjusted under 35 U.S.C. 154(b) by 677 days.

(21) Appl. No.: 12/425,679

(22) Filed: Apr. 17, 2009

(65) Prior Publication Data

US 2010/0009720 A1    Jan. 14, 2010

(30) Foreign Application Priority Data

Jul. 8, 2008   (KR) ........................ 10-2008-0066265

(51) Int. Cl.
*H04B 1/38* (2006.01)
(52) U.S. Cl.
USPC ........... 455/563; 455/550.1; 455/418; 455/79

(58) Field of Classification Search
USPC ................................. 455/563, 550.1, 418, 79
See application file for complete search history.

(56) References Cited

U.S. PATENT DOCUMENTS

2007/0182595 A1 * 8/2007 Ghasabian ...................... 341/22
2009/0253463 A1 * 10/2009 Shin et al. ..................... 455/563

* cited by examiner

*Primary Examiner* — Nghi H Ly
(74) *Attorney, Agent, or Firm* — Birch, Stewart, Kolasch & Birch, LLP

(57) ABSTRACT

Disclosed is a method for recognizing a voice and converting it into a text, and more particularly, a method for preferentially voice-recognizing a word starting with a character inputted through a keypad before voice is inputted and converting it into a text, and a mobile terminal implementing such method. The mobile terminal includes a keypad to receive an input of a specific character from a user; a controller to recognize voice input from the user based on words starting with the specific character, and to convert the recognized voice into text; and a display to display the text under a control of the controller.

25 Claims, 21 Drawing Sheets

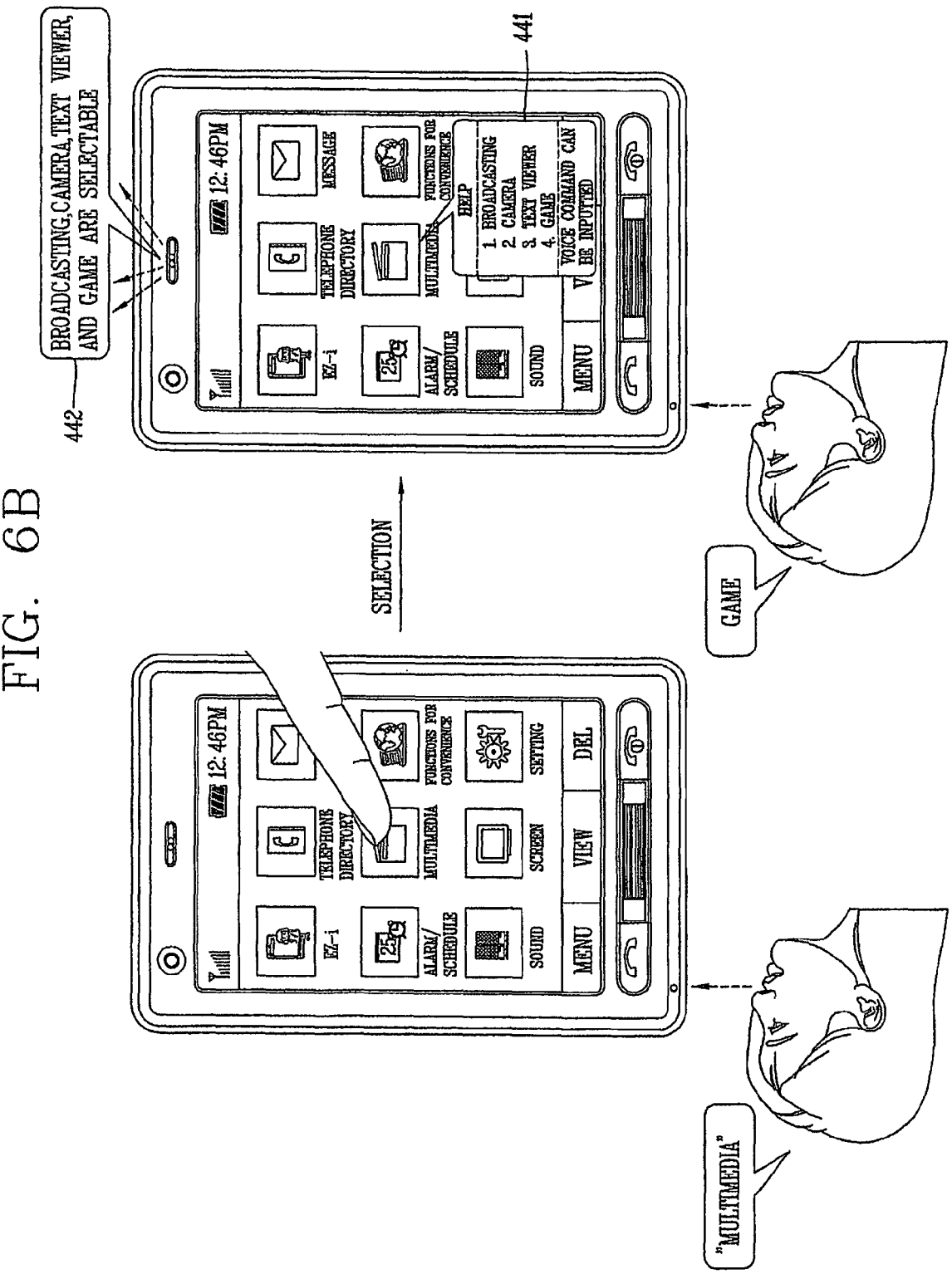

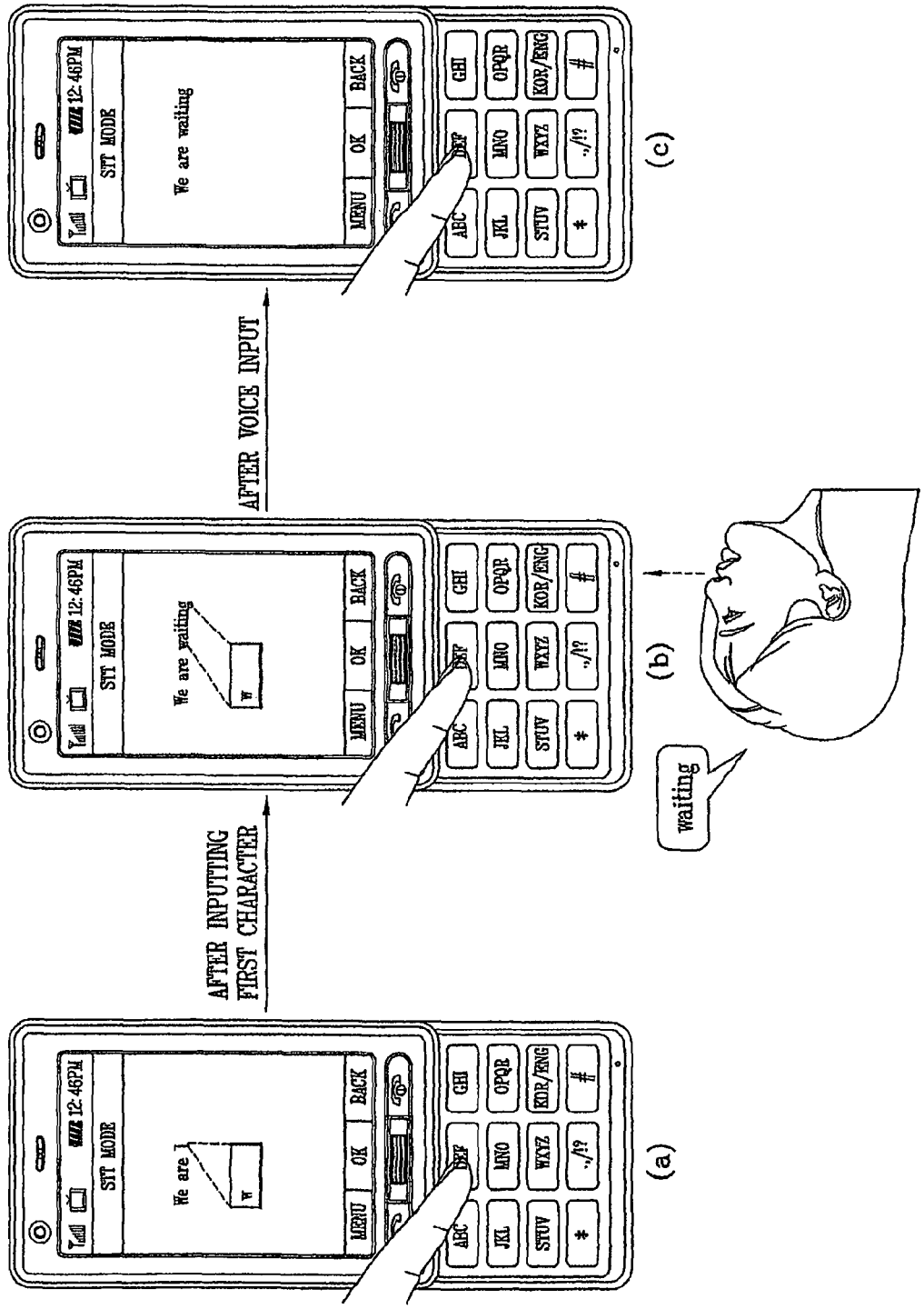

MOBILE TERMINAL AND TEXT INPUT METHOD THEREOF

RELATED APPLICATION

The present disclosure relates to subject matter contained in priority Korean Application No. 10-2008-0066265, filed on Jul. 8, 2008, which is herein expressly incorporated by reference in its entirety.

BACKGROUND OF THE INVENTION

1. Field of the Invention

The present invention relates to a method for recognizing a voice and converting it into a text, and more particularly, a method for preferentially voice-recognizing a word starting with a character inputted through a keypad before a voice is inputted, and converting it into a text, and a mobile terminal implementing such method.

2. Description of the Background Art

Mobile terminals may be configured to perform various functions, for example, data and voice communication, capturing images or video using a camera, storing voice, reproducing music files via a speaker system, displaying images or video and the like. Some of mobile terminals may include an additional function of playing games, and other mobile terminals may be implemented as multimedia players. In addition, in recent time, mobile terminals can receive broadcast or multicast signals to allow viewing of video or television programs.

Furthermore, many efforts are undergoing to support or enhance various functions of such mobile terminals. Such many efforts include not only changes and improvement of structural components implementing a mobile terminal but also software or hardware improvement. Various types of mobile terminals are employed, for example, a folder type, a slide type, a bar type, a rotary type (swivel or swing type) and the like.

In addition, the mobile terminal has been equipped with a variety of user interfaces to execute a specific function or service. For instance, voice recognition, a touch pad, a keypad, a pen input function, or the like have been adopted. However, such user interfaces have demerits, according to its characteristics, being high in recognition error rate or low in user satisfaction. Recently, research for an enhanced voice recognition rate has been performed to introduce a mobile terminal equipped with a voice recognition function.

SUMMARY OF THE INVENTION

Therefore, it is an object of the present invention to provide a method for writing a text message by combining a voice input and a key input of a keypad, and a mobile terminal implementing such method.

Another object of the present invention is to provide a method, when a voice is recognized and converted into a text, for preferentially voice-recognizing a word starting with a character inputted through a keypad before or during the voice input, and a mobile terminal implementing such a method.

Another object of the present invention is to provide a method, when a voice is recognized and converted into a text, for detecting a character inputted through a hardware keypad or a software keypad, and preferentially voice-recognizing a word starting with the detected character, and a mobile terminal implementing such method.

To achieve these and other advantages and in accordance with the purposes of the present invention, as embodied and broadly described herein, there is provided a mobile terminal, including: a keypad configured to receive an input of a specific character from a user as a key input; a controller configured to recognize a voice input from the user based on words starting with the specific character as a voice input, and to convert the recognized voice into text; and a display configured to display the text under a control of the controller.

To achieve these and other advantages and in accordance with the purposes of the present invention, as embodied and broadly described herein, there is provided a text input method for a mobile terminal, including: receiving an input of a specific character through a keypad in a voice recognition mode as a key input; recognizing a voice input from a user based on words starting with the specific character as a voice input; and converting the recognized voice into a text and inputting the text as a content of a text message.

To achieve these and other advantages and in accordance with the purposes of the present invention, as embodied and broadly described herein, there is provided a mobile terminal including a user input configured to receive input of a first character of a word from a user; a controller configured to recognize a voice input from a user pronouncing the word that includes the first character, and to convert the voice input into a text of the word; and a display to first display the first character when input by the user, then to display the word including the first character when the voice input is converted into the text of the word.

The mobile terminal according to the present invention has an effect of writing a text message by combining a voice input and a key input of a keypad.

The mobile terminal according to the present invention has an effect of enhancing a voice recognition speed and a voice recognition rate, when a voice is recognized and converted into a text, by preferentially recognizing a word starting with a character inputted through a keypad before or during the voice input.

In addition, the mobile terminal according to the present invention has an effect, when a voice is recognized and converted into a text, of receiving an inputting of a specific character through a hardware keypad or a software keypad, and preferentially voice-recognizing based on words starting with the specific character.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 6B and 6C are overviews showing a method for outputting help information of a mobile terminal according to one embodiment of the present invention;

FIGS. 15A to 15C are overviews illustrating a method for displaying a text inputted through a key in a mobile terminal when a text message is written according to one embodiment of the present invention.

DETAILED DESCRIPTION OF THE INVENTION

Figure 1:
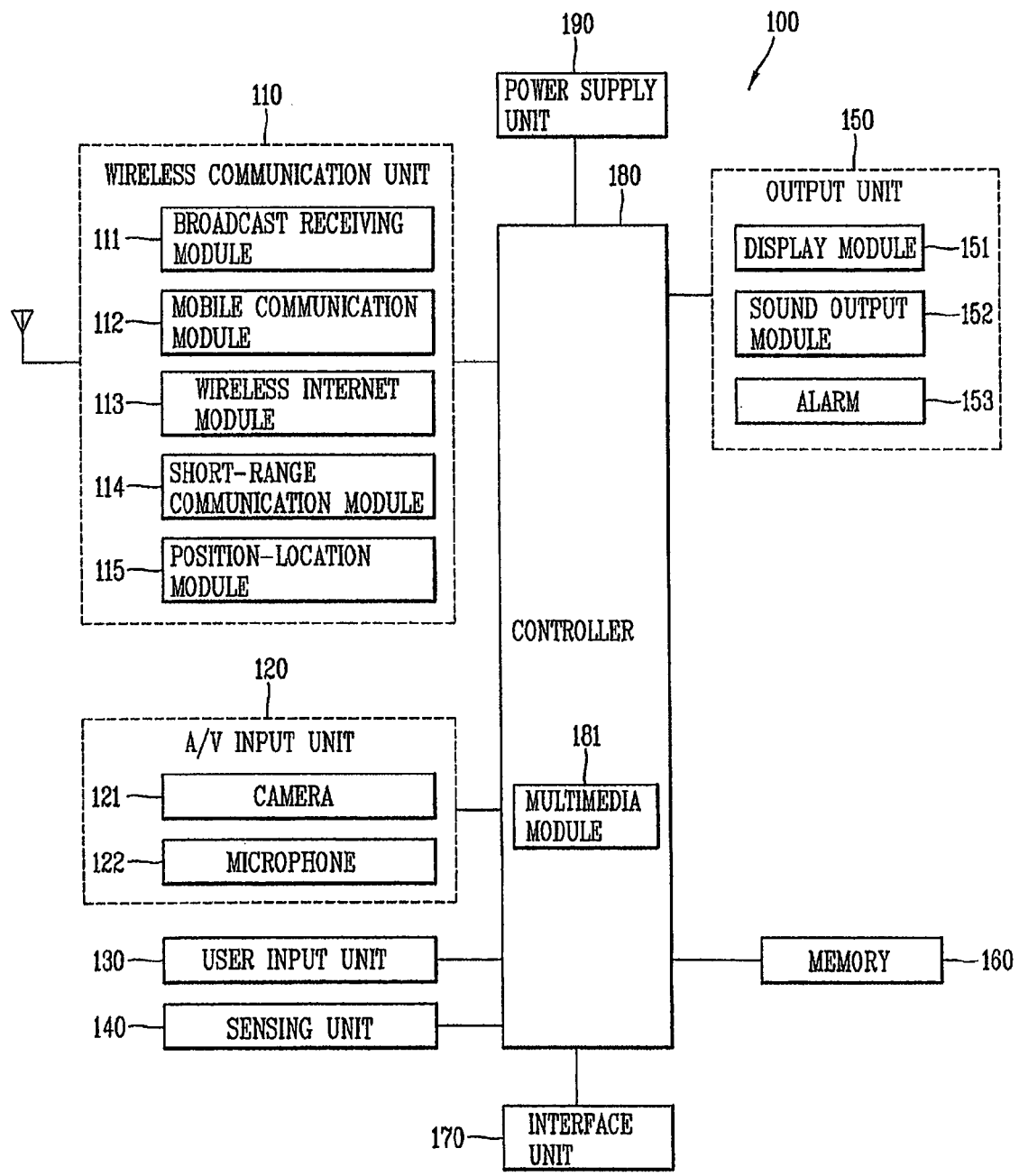
FIG. 1 is a schematic block diagram of a mobile terminal according to one embodiment of the present invention.

Description will now be given in detail of various embodiments according to the present invention, with reference to the accompanying drawings. However, known technologies which are considered as obscuring the concept of the present invention and a detailed description of their configurations will be omitted. Also, for the explanation of the present invention with reference to the drawings, components performing same functions will be represented by the same reference numerals.

Hereinafter, a mobile terminal according to the present invention will be described in more detail with reference to drawings.

FIG. 1 is a block diagram illustrating a mobile terminal according to one embodiment of the present invention.

A mobile terminal may be implemented using a variety of different types of terminals. Examples of such terminals include mobile/portable terminals, such as mobile phones, smart phones, notebook computers, digital broadcast terminals, Personal Digital Assistants (PDA), Portable Multimedia Players (PMP), navigators and the like. The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like.

FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless internet module 113, a short-range communication module 114 and a position location module 115.

The broadcast receiving module 111 receives a broadcast signal and/or broadcast associated information from an external broadcast managing server via a broadcast channel. The broadcast channel may include a satellite channel and a terrestrial channel. The broadcast managing server may indicate a server which generates and transmits a broadcast signal and/or broadcast associated information or a server which receives a pre-generated broadcast signal and/or broadcast associated information and sends them to the mobile terminal 100. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal 100. This module may be internally or externally coupled to the mobile terminal 100.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal 100. An example of the position location module 115 may include a Global Position System (GPS) module. The GPS module may receive position information in cooperation with associated multiple satellites. Here, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

The A/V input unit 120 is configured to provide audio or video signal input to the mobile terminal 100. The A/V input unit 120 may include a camera 121 and a microphone 122. The camera 121 receives and processes image frames of still pictures or video obtained by image sensors in a video call mode or a capturing mode. The processed image frames may be displayed on a display (or a display module) 151.

The image frames processed by the camera 121 may be stored in the memory 160 or transmitted to the exterior via the wireless communication unit 110. Two or more cameras 121 may be provided according to the configuration of the mobile terminal 100.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal 100. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal 100. For instance, the sensing unit 140 may detect a current state of the mobile terminal 100, such as an open/close status of the mobile terminal 100, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

The output unit 150 is configured to output an audio signal, a video signal or an alarm signal. The output unit 150 may include the display (or the display module) 151, an audio output module (or a sound output module) 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal 100 is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using at least one of, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. The mobile terminal 100 may include two or more of such displays 151 according to its embodiment. For example, the mobile terminal 100 may simultaneously include an external display (not shown) and an internal display (not shown).

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm 153 may output a signal to inform a generation of event associated with the mobile terminal 100. Typical events may include call received, message received, user input received and the like. In addition to generating the audio or video signal, the alarm 153 may also output a signal to inform the event generation in different manners for example, by providing tactile sensations (e.g., vibration) to a user.

The alarm 153 may also be configured to vibrate responsive to the mobile terminal 100 receiving a call or message. As another example, vibration is provided by the alarm 153 responsive to receiving user input at the mobile terminal 100, thus providing a tactile feedback mechanism. Such vibration can also be provided to make a user recognize the event generation. The signal informing the event generation may be outputted via the display 151 or the audio output module 152.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing associated with voice calls, data communications, video calls, and the like. The controller 180 may include a multimedia module 181 which provides multimedia playback. The multimedia module 181 may be configured as part of the controller 180 or as a separate component.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

As mentioned above, the internal components of the mobile terminal 100 related to the present invention have been described from the perspective of their functions. Hereinafter, external components of the mobile terminal 100 related to the present invention will be described from the perspective of their functions with reference to FIGS. 2 and 3. The mobile terminal 100 may be implemented in a variety of different configurations. Examples of such configurations include folder type, bar type, swing type, slide type or the like. For the sake of brief explanation, further disclosure will primarily relate to a slide-type mobile terminal. However, the present invention may not be limited to the slide-type mobile terminal, but can be applied to other types of terminals including the aforesaid types of terminals.

Figure 2:
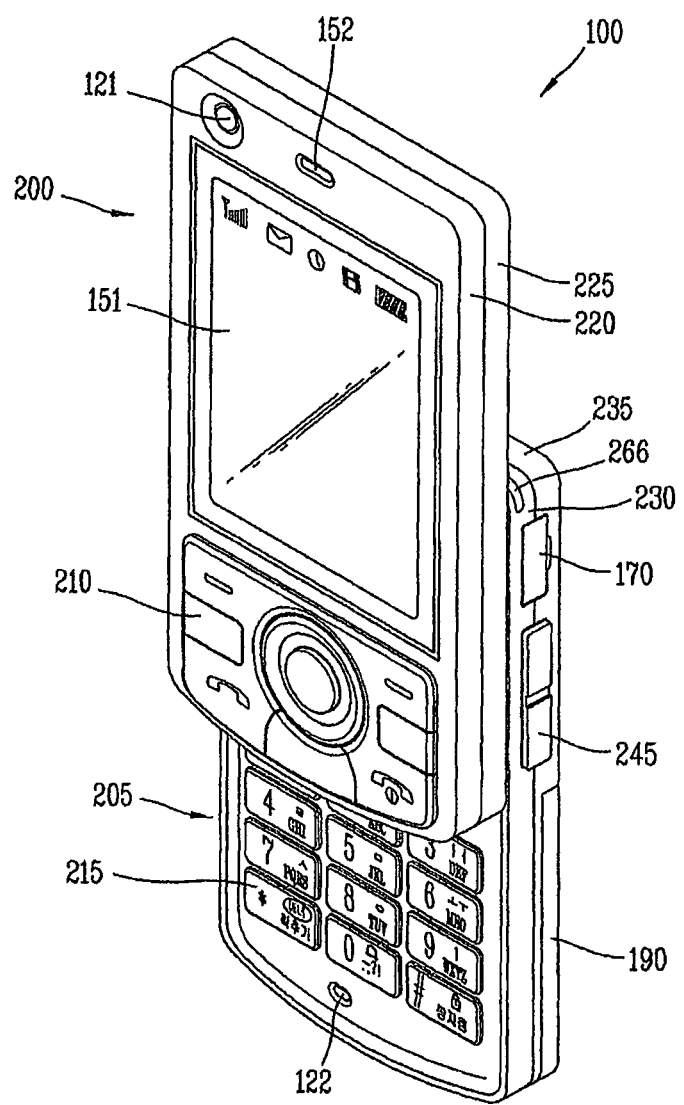
FIG. 2 is a front perspective view showing an exemplary mobile terminal according to the present invention.

FIG. 2 is a front perspective view of a mobile terminal in accordance with one embodiment of the present invention.

The mobile terminal 100 of the present invention may comprise a first body 200, and a second body 205 configured to slidably cooperate with the first body 200 in at least one direction.

The first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position).

The mobile terminal 100 may be operable in a standby (idle) mode when in the closed configuration, but this mode can be released by the user's manipulation. Also, the mobile terminal 100 may typically be operable in an active (phone call) mode in the open configuration. Here, this mode may be changed into the idle mode according to the user's manipulation or after a certain time elapses.

A case (housing, casing, cover, etc.) forming the outside of the first body 200 is formed by a first front case 220 and a first rear case 225. Various electronic components may be disposed in a space between the first front case 220 and the first rear case 225. One or more intermediate cases may additionally be disposed between the first front case 220 and the first rear case 225.

The cases can be formed of resin in a manner of injection molding, or formed using metallic materials such as stainless steel (STS) and titanium (Ti).

A display 151, an audio output module 152, a camera 121 or a first user input unit 210 may be disposed at the first front case 220 of the first body 200.

The display 151 may include LCD, OLED, and the like, which can visibly display information.

The display 151 and a touchpad can be layered with each other such that the display 151 can be configured to function as a touch screen so as to allow a user to input information in a touching manner.

The audio output module 152 may be implemented as a speaker.

The camera 121 may be implemented to be suitable for a user to capture still images or video.

Like the first body 200, a case configuring the outside of the second body 205 may be formed by a second front case 230 and a second rear case 235.

The second user input unit 215 may be disposed at the second body 205, in detail, at a front face of the second front case 230.

A third user input unit 245, a microphone 122 and an interface unit 170 may be disposed either at the second front case 230 or at the second rear case 235.

The first to third user input units 210, 215 and 245 may be named as a user input unit 130. Any tactile manner that a user can touch, e.g., the display 1515 for manipulation can be employed for the user input unit 130.

For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 is used for inputting commands such as START, END, SCROLL or the like, and the second user input unit 215 is used for inputting numbers, characters, symbols, or the like.

Also, the third user input unit 245 can be operated as a hot key for activating a specific function within the mobile terminal 100.

The microphone 122 may be implemented to be suitable for receiving user's voice or various sounds.

The interface unit 170 may be used as a passage through which the mobile terminal related to the present invention can exchange data or the like with an external device. For example, the interface unit 170 may be implemented as at least one of a wired/wireless connection port for connecting an earphone to the mobile terminal 100, a port for short-range communications (e.g., an Infrared Data Association (IrDA) port, a Bluetooth port, a wireless LAN port, etc.), power supply ports for providing power to the mobile terminal 100, or the like.

The interface unit 170 can be a card socket for receiving an external card, such as a Subscriber Identity Module (SIM), a User Identity Module (UIM), a memory card for storing information, or the like.

The power supply 190 may be disposed at a side of the second rear case 235 to provide power to the mobile terminal 100.

The power supply 190 may be a rechargeable battery, for example, to be attachable/detachable for charging.

Figure 3:
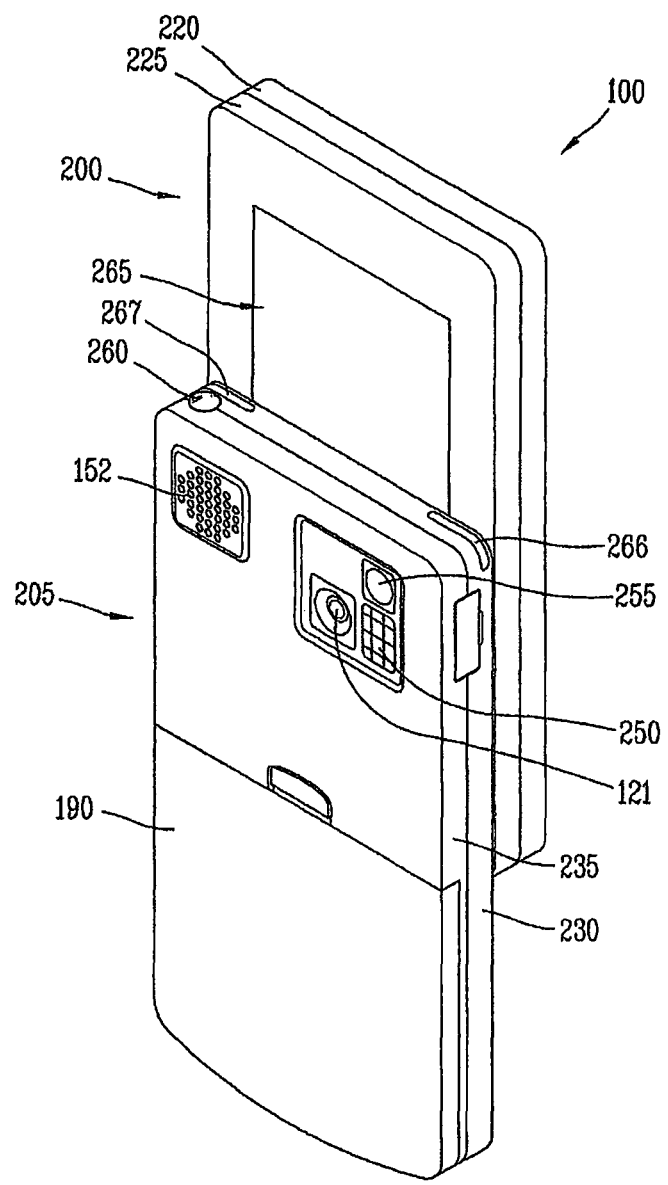
FIG. 3 is a rear perspective view showing the mobile terminal in FIG. 2.

FIG. 3 is a rear view of the mobile terminal according to the one embodiment of the present invention.

As illustrated in FIG. 3, a camera 121 may further be disposed at a rear face of the second rear case 235 of the second body 205. The camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use.

A flash 250 and a mirror 255 may additionally be disposed adjacent to the camera 121 of the second body 205. The flash 250 operates in conjunction with the camera 121 of the second body 250 when taking a picture using the camera 121 of the second body 205. The mirror 255 can cooperate with the camera 121 of the second body 205 to allow a user to photograph himself in a self-portrait mode.

The second rear case 235 may further include an audio output module 152.

The audio output module 152 of the second body 205 can cooperate with the audio output module 152 of the first body 200 to provide stereo output. Also, the audio output module 152 may be configured to operate as a speakerphone.

A broadcast signal receiving antenna 260 may be disposed at one side of the second rear case 235, in addition to an antenna for communications. The antenna 260 can be configured to retract into the second body 205.

One part of a slide module 265 which allows the first body 200 to be slidably coupled to the second body 205 may be disposed at the first rear case 225 of the first body 200.

The other part of the slide module 265 may be disposed at the second front case 230 of the second body 205, such that it may not be exposed to the exterior as illustrated in the drawing of the present invention.

As such, it has been described that the second camera 121, and the like are disposed at the second body 205; however, the present invention need not be limited to the configuration.

For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal 100. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may be configured to operate within a communication system which transmits data via frames or packets, including both wireless and wireline communication systems, and satellite-based communication systems.

Hereinafter, a communication system within which the mobile terminal related to the present invention can operate will be described with reference to FIG. 4.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
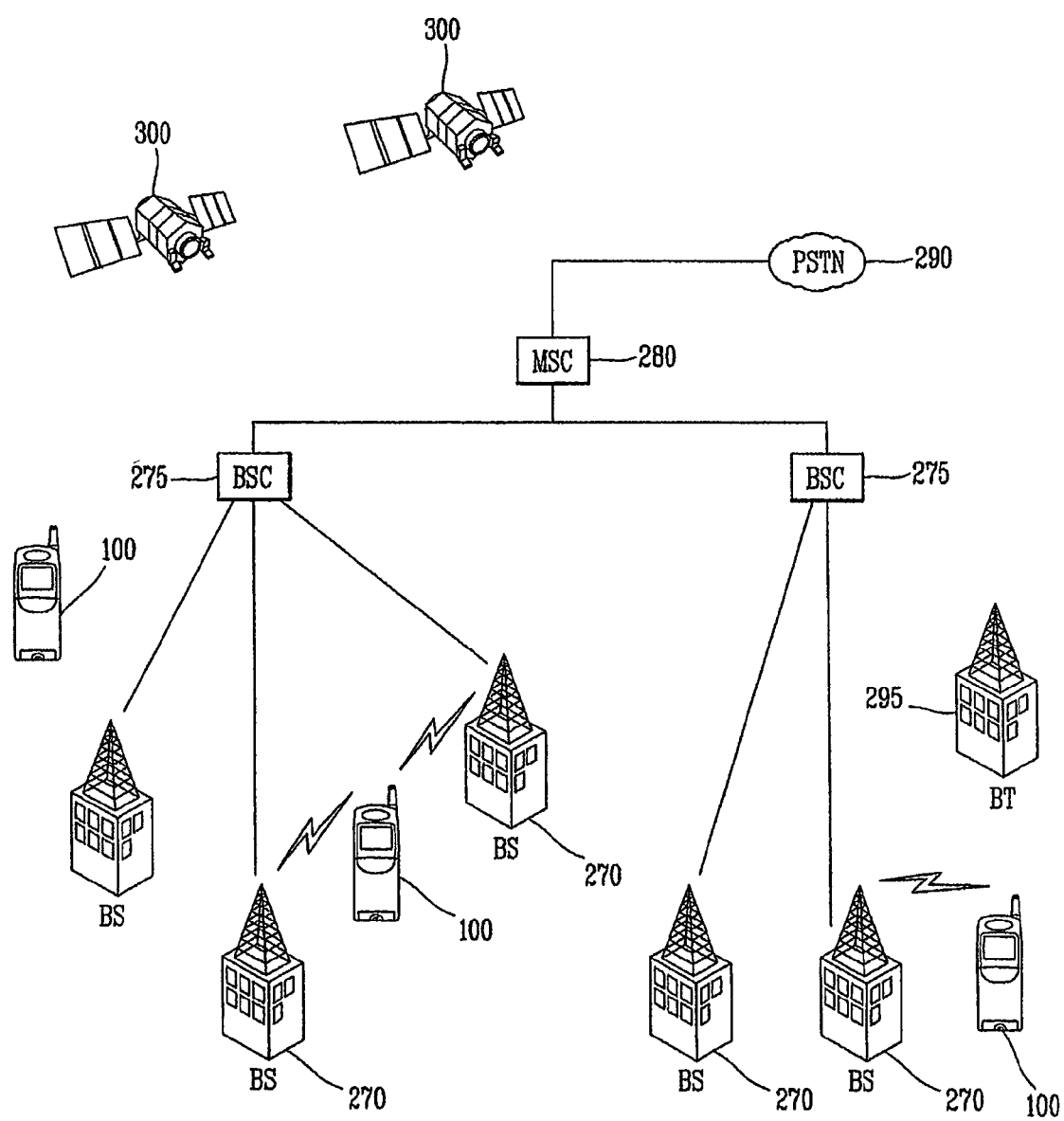
FIG. 4 is an overview of an exemplary communication system operable with the mobile terminal according to the present invention.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switched Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations

270. The base stations may also be denoted as "cell sites." Alternatively, individual sectors of a given base station 270 may be referred to as cell sites.

A broadcasting transmitter (BT) 295, as shown in FIG. 4, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

The mobile terminal according to the present invention is configured such that an algorithm for voice recognition and an algorithm for Speech To Text (STT) are stored in the memory 160. A particular function provided in the mobile terminal, the voice recognition function and the STT function all cooperate together so as to convert voice which a user wants to input into a text format. Such converted text can be output on an execution screen of those functions. Here, the particular function may include a function of generating text, such as text messages or mails. In cooperation with the execution of the particular function, the controller 180 can activate the voice recognition function and automatically drive the STT function.

Figure 5:
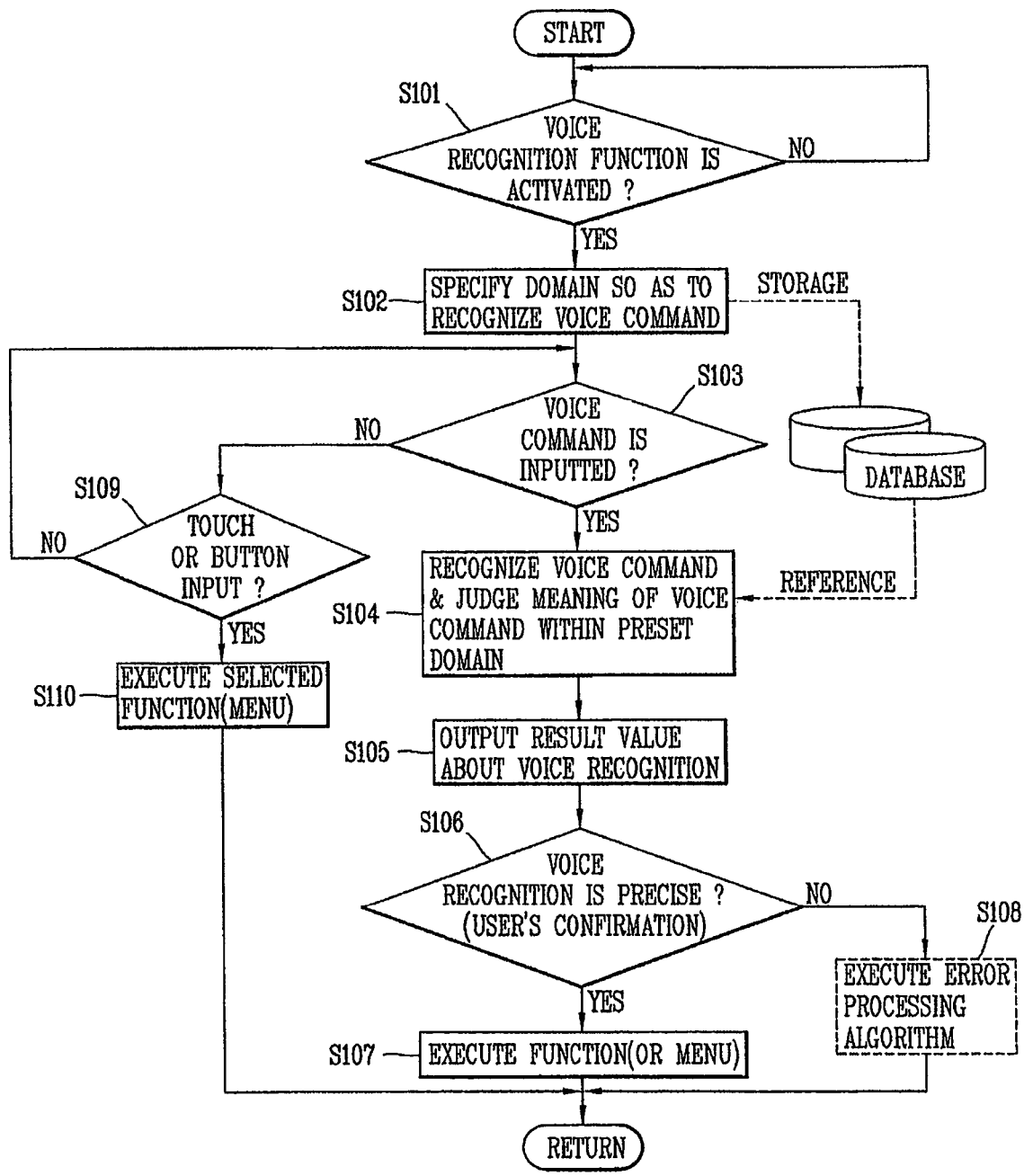
FIG. 5 is a flowchart illustrating a menu control method for a mobile terminal through a voice command according to one embodiment of the present invention.

FIG. 5 is a flowchart showing a menu control method for a mobile terminal through a voice command according to an embodiment of the present invention. As shown in FIG. 5, the controller 180 determines if the voice recognition function has been activated (S101).

Further, the voice recognition function may be activated by the user selecting hardware buttons on the mobile terminal 100, or soft touch buttons displayed on the display module 151. The user may also activate the voice recognition function by manipulating specific menus displayed on the display 151. The voice recognition function may also be activated by the user generating a specific sound or sound effects, by short or long-range wireless signals, or by the user's body information such as hand gesture or body gesture.

In more detail, the specific sound or sound effects may include impact sounds having a level more than a specific level. Further, the specific sound or sound effects may simply be detected using a sound level detecting algorithm.

In addition, the sound level detecting algorithm is preferably simpler than a voice recognition algorithm, and thus consumes less resources of the mobile terminal. Also, the sound level detecting algorithm (or circuit) may be individually implemented from the voice recognition algorithm or circuit, or may be implemented so as to specify some functions of the voice recognition algorithm.

In addition, the wireless signals may be received through the wireless communication unit 110, and the user's hand or body gestures may be received through the sensing unit 140. Thus, in an embodiment of the present invention, the wireless communication unit 110, the user input unit 130, and the sensing unit 140 may be referred to as a signal input unit. Further, the voice recognition function may also be terminated in a similar manner.

Having the user physically activate the voice recognition function is particularly advantageous, because the user is more aware they are about to use voice commands to control the mobile terminal. That is, because the user has to first perform a physical manipulation of the mobile terminal, he or she intuitively recognizes they are going to input a voice command or instruction into the mobile terminal, and therefore speak more clearly or slowly to thereby activate a particular function. Thus, because the user speaks more clearly or more slowly, for example, the probability of accurately recognizing the voice instruction increases. That is, in an embodiment of the present invention, the activation of the voice recognition function is performed by a physical manipulation of a button on the mobile terminal rather than activating the voice recognition function by speaking into the mobile terminal.

Further, the controller 180 may start or terminate activation of the voice recognition function based on how many times the user touches a particular button or portion of the touch screen, how long the user touches a particular button or portion of the touch screen, etc. The user can also set how the controller 180 is to activate the voice recognition function using an appropriate menu option provided by the present invention. For example, the user can select a menu option on the mobile terminal that includes 1) set activation of voice recognition based on X number of times the voice activation button is selected, 2) set activation of voice recognition based on X amount of time the voice activation button is selected, 3) set activation of voice recognition when the buttons X and Y are selected, etc. The user can then enter the values of X and Y in order to variably set how the controller 180 determines the voice activation function is activated. Thus, according to an embodiment of the present invention, the user is actively engaged with the voice activation function of their own mobile terminal 100, which increases the probability that the controller 180 will determine the correct function corresponding to the user's voice instruction, and which allows the user to tailor the voice activation function according to his or her needs.

The controller 180 may also maintain the activated state of the voice recognition function while the designated button(s) are touched or selected, and stop the voice recognition function when the designated button(s) are released. Alternatively, the controller 180 can maintain the activation of the voice recognition function for a predetermined time period after the designated button(s) are touched or selected, and stop or terminate the voice recognition function when the predetermined time period ends. In yet another embodiment, the controller 180 can store received voice instructions in the memory 160 while the voice recognition function is maintained in the activated state.

In addition, as shown in FIG. 5, a domain of the database used as a reference for recognizing the meaning of the voice command is specified to information relating to specific functions or menus on the mobile terminal (S102). For instance, the specified domain of database may be information relating to menus currently displayed on the display 151, or information relating to sub-menus of one of the displayed menus. Further, because the domain of database is specified, the recognition rate for the input voice command is improved. Examples of domains include an e-mail domain, a received calls domain, and multimedia domain, etc.

Also, the information relating to sub-menus may be configured as data in a database. For example, the information may be configured in the form of a keyword, and a plurality of information may correspond to one function or menu. In addition, the database can be a plurality of databases according to features of information, and may be stored in the memory 160.

Further, the information in the database(s) may be advantageously updated or renewed through a learning process. Each domain of the respective databases may also be specified into a domain relating to functions or menus being currently output, so as to enhance a recognition rate for a voice command. The domain may also change as menu steps continue to progress.

Once the voice recognition function is activated (Yes in S101) and the domain has been specified (S102), the controller 180 determines if the user has input a voice command (S103). When the controller 180 determines the user has input the voice command (Yes in S103), the controller 180 analyzes a context and content of a voice command or instruction input through the microphone 122 based on a specific database, thereby judging a meaning of the voice command (S104).

Further, the controller 180 can determine the meaning of the voice instruction or command based on a language model and an acoustic model of the accessed domain. In more detail, the language model relates to the words themselves and the acoustic model corresponds to the way the words are spoken (e.g., frequency components of the spoken words or phrases). Using the language and acoustic models together with a specific domain and a state of the mobile terminal 100, the controller 180 can effectively determine the meaning of the input voice instructions or command.

Further, the controller 180 may immediately start the process for judging the meaning of the input voice command when the user releases the activation of the voice recognition function when the controller 180 stores the input voice command in the memory 160, or may simultaneously perform the voice activation function when the voice command is input.

In addition, if the voice command has not been fully input (No in S103), the controller 180 can still perform other functions. For example, if the user performs another action by touching a menu option, etc. or presses a button on the mobile terminal (Yes in S109), the controller 180 performs the corresponding selected function (S110).

Further, after the controller 180 determines the meaning of the input voice command in step S104, the controller 180 outputs a result value of the meaning (S105). That is, the result value may include control signals for executing menus relating to functions or services corresponding to the determined meaning, for controlling specific components of the mobile terminal, etc. The result value may also include data for displaying information relating to the recognized voice command.

The controller 180 may also request the user confirm the output result value is accurate (S106). For instance, when the voice command has a low recognition rate or is determined to have a plurality of meanings, the controller 180 can output a plurality of menus relating to the respective meanings, and then execute a menu that is selected by the user (S107). Also, the controller 180 may ask a user whether to execute a specific menu having a high recognition rate, and then execute or display a corresponding function or menu according to the user's selection or response.

In addition, the controller 180 can also output a voice message asking the user to select a particular menu or option such as "Do you want to execute a message composing function? Reply with Yes or No." Then, the controller 180 executes or does not execute a function corresponding to the particular menu or option based on the user's response. If the user does not respond in a particular time period (e.g., five seconds), the controller 180 can also immediately execute the particular menu or option. That is, if there is no response from the user, the controller 180 may automatically execute the function or menu by judging the non-response as a positive answer.

That is, the error processing step may be performed (S108) by again receiving input of a voice command, or may be performed by displaying a plurality of menus having a recognition rate more than a certain level or a plurality of menus that may be judged to have similar meanings. The user can then select one of the plurality of menus. Also, when the number of functions or menus having a recognition rate more than a certain level is less than a preset number (e.g., two), the controller 180 can automatically execute the corresponding function or menu.

Figure 6A:
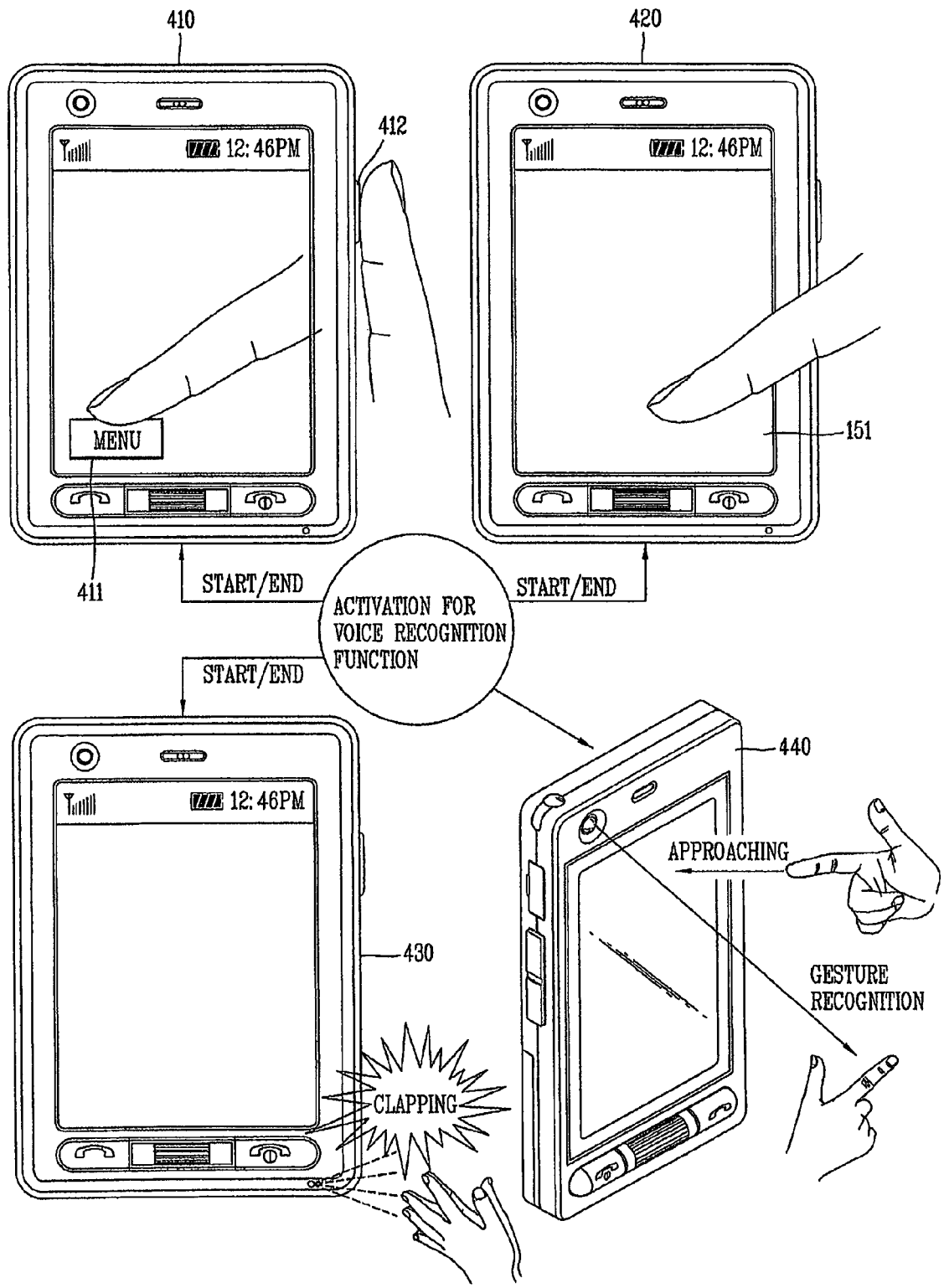
FIG. 6A is an overview showing a method for activating a voice recognition function for a mobile terminal according to one embodiment of the present invention.

Next, FIG. 6A is an overview showing a method for activating a voice recognition function for a mobile terminal according to an embodiment of the present invention. As shown in the display screen 410, the user can activate the voice recognition function by touching a soft button 411. The user can also terminate the voice recognition function by releasing the soft button 411. In more detail, the user can activate the voice recognition function by touching the soft button 411 and continuously touch the soft button 411, or hard button 412, until the voice instruction has been completed. That is, the user can release the soft button 411 or hard button 412 when the voice instruction has been completed. Thus, the controller 180 is made aware of when the voice instruction is to be input and when the voice instruction has been completed. As discussed above, because the user is directly involved in this determination, the accuracy of the interpretation of the input voice command is increased.

The controller 180 can also be configured to recognize the start of the voice activation feature when the user first touches the soft button 411, and then recognize the voice instruction has been completed when the user touches the soft button 411 twice, for example. Other selection methods are also possible. Further, as shown in the display screen 410 in FIG. 6A, rather than using the soft button 411, the voice activation and de-activation can be performed by manipulating a hard button 412 on the mobile terminal.

In addition, the soft button 411 shown in the display screen 410 can be a single soft button that the user presses or releases to activate/deactivate the voice recognition function or may be a menu button that when selected produces a menu list such as "1. Start voice activation, and 2. Stop voice activation"). The soft button 411 can also be displayed during a standby state, for example.

In another example, and as shown in the display screen 420, the user can also activate and deactivate the voice recognition function by touching an arbitrary position of the screen. The display screen 430 illustrates yet another example in which the user activates and deactivates the voice recognition function by producing a specific sound or sound effects that is/are greater than a specific level. For example, the user may clap their hands together to produce such an impact sound.

Thus, according to an embodiment of the present invention, the voice recognition function may be implemented in two modes. For example, the voice recognition function may be implemented in a first mode for detecting a particular sound or sound effects more than a certain level, and in a second mode for recognizing a voice command and determining a meaning of the voice command. If the sound or sound effects is/are more than a certain level in the first mode, the second mode is activated to thereby to recognize the voice command.

The display screen 440 illustrates still another method of the user activating and deactivating the voice recognition function. In this example, the controller 180 is configured to interpret body movements of the user to start and stop the voice activation function. For example, and as shown in the display screen 440, the controller 180 may be configured to interpret the user moving his hand toward the display as an instruction to activate the voice recognition function, and the user moving his hand away from the display as an instruction to terminate the voice activation function. Short or long-range wireless signals may also be used to start and stop the voice recognition function.

Thus, according to an embodiment of the present invention, because the voice activation function is started and stopped, the voice recognition function is not continuously executed. That is, when the voice recognition function is continuously maintained in the activated state, the amount of resources on the mobile terminal is increased compared to the embodiment of the present invention.

Further, as discussed above with respect to FIG. 5, when the voice recognition function is activated, the controller 180 specifies a domain of a specific database that is used as a reference for voice command recognition into a domain relating to a menu list on the display 151. Then, if a specific menu is selected or executed from the menu list, the domain of the database may be specified into information relating to the selected menu or sub-menus of the specific menu.

Figure 6C:
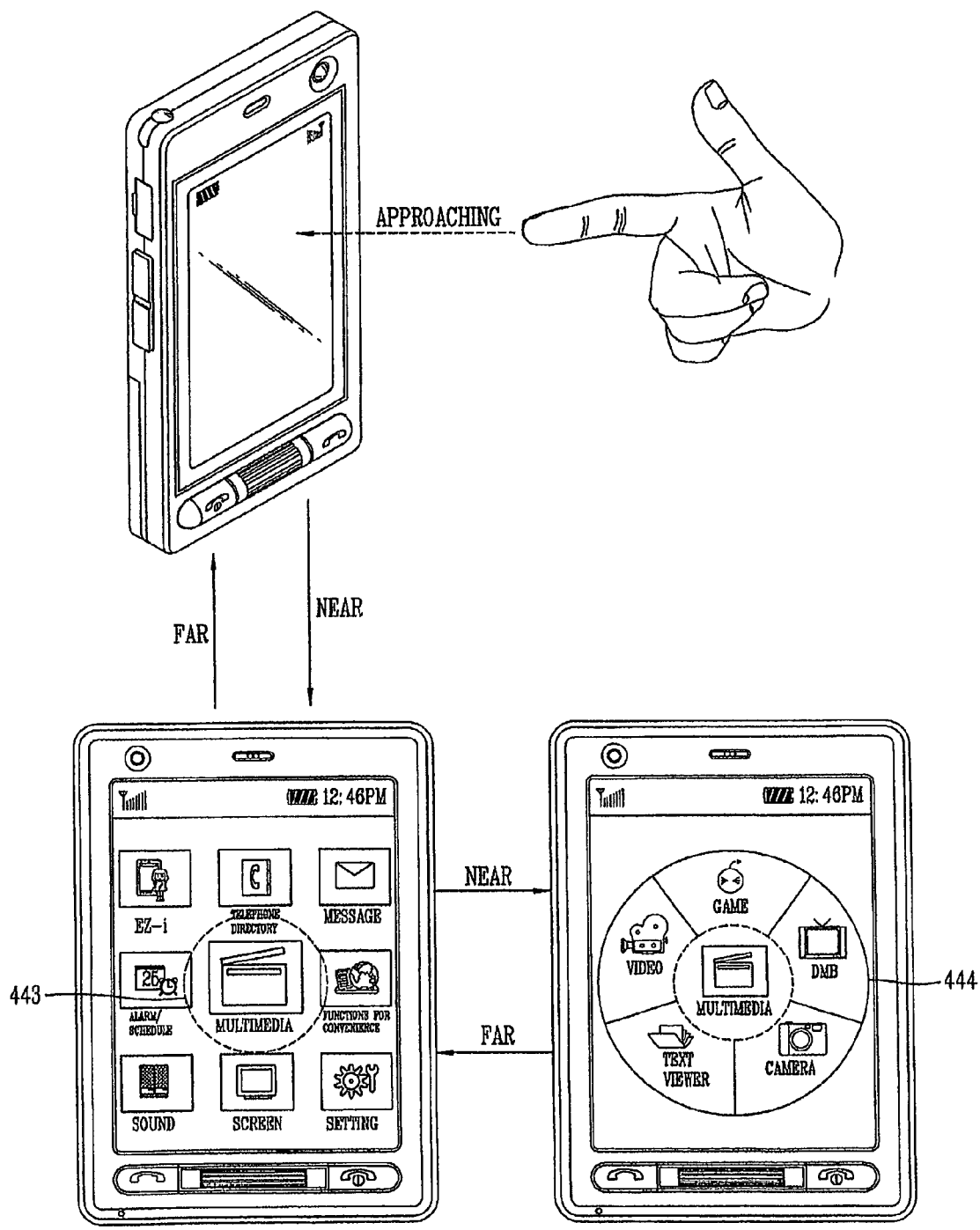

In addition, when the specific menu is selected or executed through a voice command or touch input, the controller 180 may output help information relating to sub-menus of the specific menu in the form of a voice message, or pop-up windows or balloons. For example, as shown in FIG. 6B, when the user selects the 'multimedia menu' via a touching or voice operation, the controller 180 displays information relating to the sub-menus (e.g., broadcasting, camera, text viewer, game, etc.) of the 'multimedia menu' as balloon-shaped help information 441. Alternatively, the controller 180 can output a voice signal 442 including the help information. The user can then select one of the displayed help options using a voice command or by a touching operation FIG. 6C illustrates an embodiment of a user selecting a menu item using his or her body movements (in this example, the user's hand gesture). In more detail, as the user moves his or her finger closer to the menu item 443, the controller 180 displays the sub-menus 444 related to the menu 443. The controller 180 can recognize the user's body movement of information via the sensing unit 140, for example. In addition, the displayed help information can be displayed so as to have a transparency or brightness controlled according to the user's distance. That is, as the user's hand gets closer, the displayed items can be further highlighted.

As discussed above, the controller 180 can be configured to determine the starting and stopping of the voice recognition function based on a variety of different methods. For example, the user can select/manipulate soft or hard buttons, touch an arbitrary position on the touch screen, etc. The controller 180 can also maintain the activation of the voice recognition function for a predetermined amount of time, and then automatically end the activation at the end of the predetermined amount of time. Also, the controller 180 may maintain the activation only while a specific button or touch operation is performed, and then automatically end the activation when the input is released. The controller 180 can also end the activation process when the voice command is no longer input for a certain amount of time.

Figure 7A:
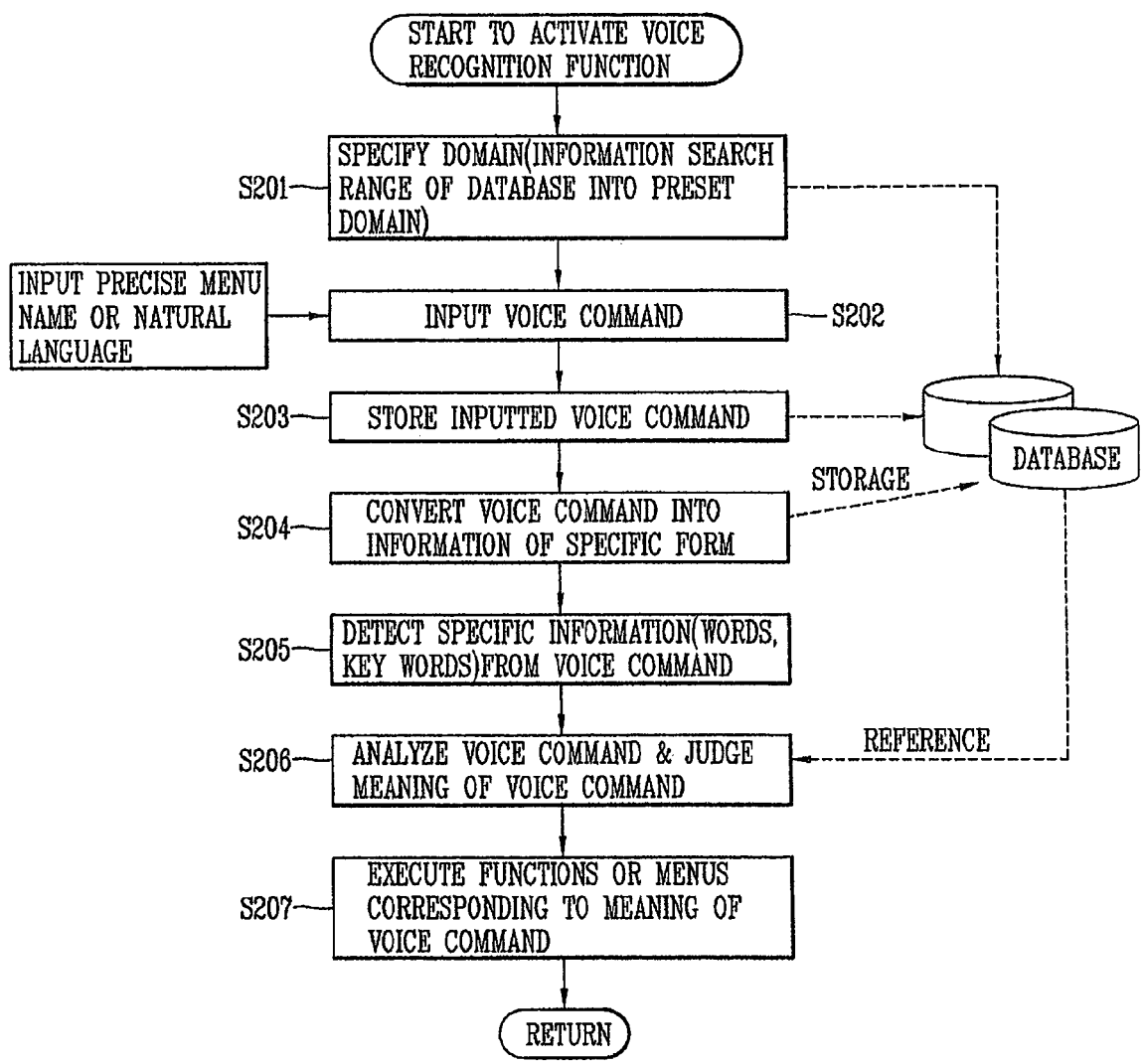
FIG. 7A is a flowchart showing a method for recognizing a voice command of a mobile terminal according to one embodiment of the present invention.

Next, FIG. 7A is a flowchart showing a method for recognizing a voice command in a mobile terminal according to an embodiment of the present invention. Referring to FIG. 7A, when the voice recognition function is activated, the controller 180 specifies a domain of a database that can be used as a reference for voice command recognition into a domain relating to a menu displayed on the display 151, sub-menus of the menu, or a domain relating to a currently-executed function or menu (S201). The user also inputs the voice command (S202) using either the precise menu name or using a natural language (spoken English, for example).

The controller 180 then stores the input voice command in the memory 160 (S203). Further, when the voice command is input under a specified domain, the controller 180 analyzes a context and content of the voice command based on the specified domain by using a voice recognition algorithm. Also, the voice command may be converted into text-type information for analysis (S204), and then stored in a specific database of the memory 160. However, the step of converting the voice command into text-type information can be omitted.

Then, to analyze the context and content of the voice command, the controller 180 detects a specific word or keyword of the voice command (S205). Based on the detected words or keywords, the controller 180 analyzes the context and content of the voice command and determines or judges a meaning of the voice command by referring to information stored in the specific database (S206).

In addition, as discussed above, the database used as a reference includes a specified domain, and functions or menus corresponding to a meaning of the voice command judged based on the database are executed (S207). For example, if it is assumed that text is input using a STT function after executing the text message writing function, the priorities of such information for the voice command recognition may be set to commands related to modifying text or commands related to searching for another party to receive the text message or transmission of such message. Also, because the database for voice recognition is specified to each information relating to a currently-executed function or menu, the recognition rate and speed for of recognizing the voice command are improved, and the amount of resources used on the mobile terminal is reduced. Further, the recognition rate indicates a matching degree with a name preset to a specific menu.

The recognition rate for an input voice command may also be judged by the number of information relating to specific functions or menus of the voice command. Therefore, the recognition rate for the input voice command is improved when the information precisely matches a specific function or menu (e.g., menu name) that is included in the voice command.

Figure 7B:
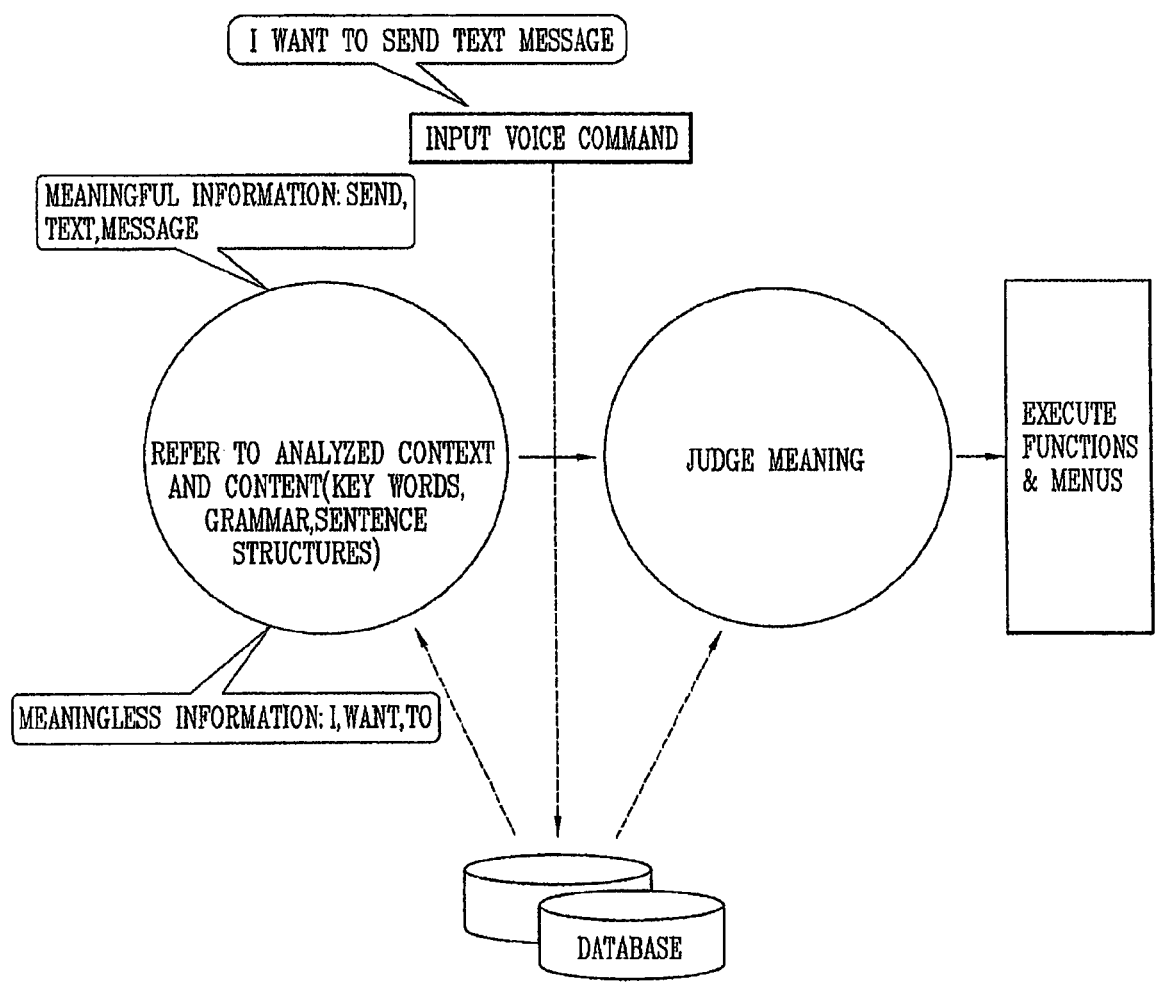
FIG. 7B is an overview showing a method for recognizing a voice command of a mobile terminal according to one embodiment of the present invention.

In more detail, FIG. 7B is an overview showing a method for recognizing a voice command of a mobile terminal according to an embodiment of the present invention. As shown in FIG. 7B, the user inputs a voice command as a natural language composed of six words "I want to send text messages." In this example, the recognition rate can be judged based on the number of meaningful words (e.g., send, text, messages) relating to a specific menu (e.g., text message). In addition, the controller 180 can determine whether the words included in the voice command are meaningful words relating to a specific function or menu based on the information stored in the database. For instance, meaningless words included in the natural language voice command (e.g., I want to send text messages) that are irrelevant to the specific menu may be the subject (I) or the preposition (to).

Also, the natural language is a language commonly used by people, and has a concept contrary to that of an artificial language. Further, the natural language may be processed by using a natural language processing algorithm. The natural language may or may not include a precise name relating to a specific menu, which sometimes causes a difficulty in completely precisely recognizing a voice command. Therefore, according to an embedment of the present invention, when a voice command has a recognition rate more than a certain level (e.g., 80%), the controller 180 judges the recognition to be precise.

Further, when the controller 180 judges a plurality of menus to have similar meanings, the controller 180 displays the plurality of menus and the user can select one of the displayed menus to have its functions executed. In addition, a menu having a relatively higher recognition rate may be displayed first or distinctively displayed compared to the other menus.

Figure 8:
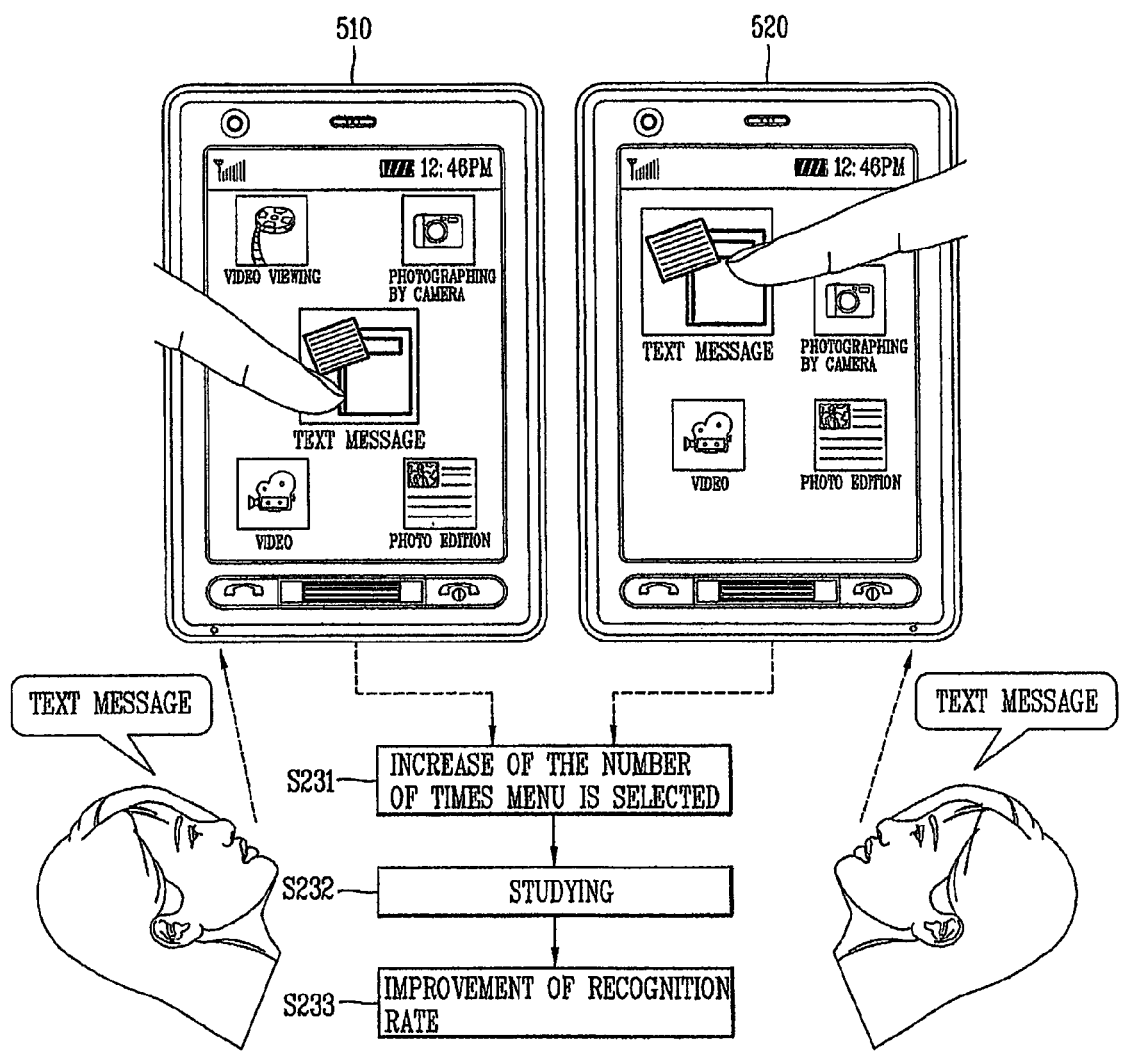
FIG. 8 is an overview showing a method for displaying menus for a voice recognition rate of a mobile terminal according to one embodiment of the present invention.

For example, FIG. 8 is an overview showing a method for displaying menus for a voice recognition rate of a mobile terminal according to an embodiment of the present invention. As shown in FIG. 8, a menu icon having a higher recognition rate is displayed at a central portion of the display screen 510, or may be displayed with a larger size or a darker color as shown in the display screen 520. The menu icon having the higher recognition rate can also be displayed first and then followed in order or sequential manner by lower recognition rate menus.

Further, the controller 180 can distinctively display the plurality of menus by changing at least one of the size, position, color, brightness of the menus or by highlighting in the order of a higher recognition rate. The transparency of the menus may also be appropriately changed or controlled.

In addition, as shown in the lower portion of FIG. 8, a menu having a higher selection rate by a user may be updated or set to have a recognition rate. That is, the controller 180 stores a history of the user selection (S231) and performs a learning process (S232) to thereby update a particular recognition rate for a menu option that is selected by a user more than other menu option (S233). Thus, the number of times a frequently used menu is selected by a user may be applied to recognition rate of the menu. Therefore, a voice command input in the same or similar manner in pronunciation or content may have a different recognition rate according to how many times a user selects a particular menu.

Further, the controller 180 may also store time at which the user performs particular functions. For example, a user may check emails or missed messages every time they wake up on Mondays through Fridays. This time information may also be used to improve the recognition rate. The state of the mobile terminal (e.g., standby mode, etc.) may also be used to improve the recognition rate. For example, the user may check emails or missed messages when first turning on their mobile terminal, when the mobile terminal is opened from a closed position, etc.

Figure 9:
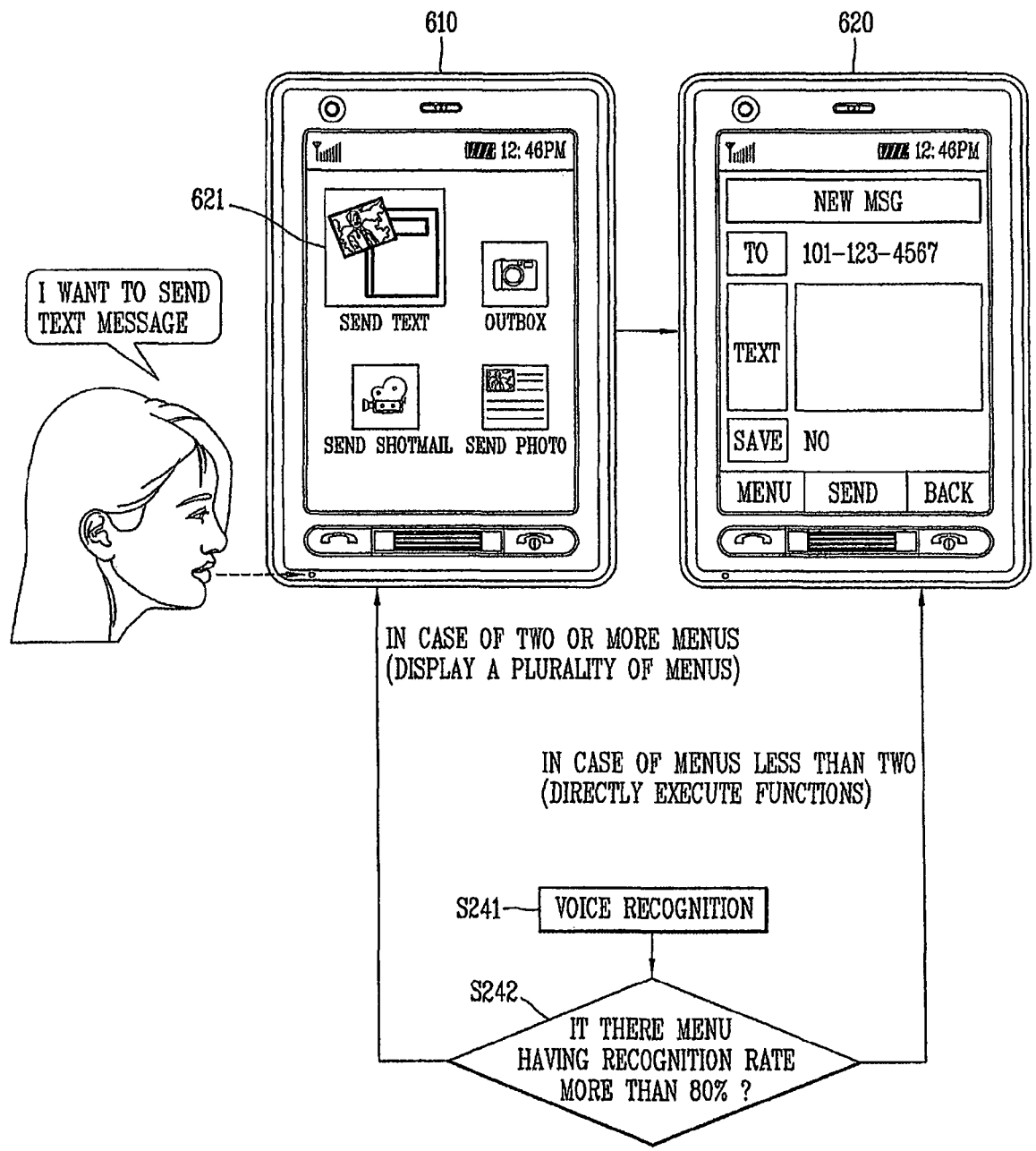
FIG. 9 is an overview showing a method for recognizing a voice command of a mobile terminal according to another embodiment of the present invention.

Next, FIG. 9 is an overview showing a method for recognizing a voice command of a mobile terminal according to another embodiment of the present invention. As shown in FIG. 9, the user activates the voice recognition function, and inputs the voice command "I want to send text messages." The controller 180 then specifies a domain of a database for voice command recognition into a domain relating to the displayed sub-menus. The controller 180 then interprets the voice command (S241) and in this example, displays a plurality of menus that have a probability greater than a particular value (e.g., 80%) (S242). As shown in the display screen 610 in FIG. 9, the controller displays four multimedia menus.

The controller 180 also distinctively displays a menu having the highest probability (e.g., specific menu option 621 "Send Text" in this example). The user can then select any one of the displayed menus to execute a function corresponding to the selected menu. In the example shown in FIG. 9, the user selects the Send Text menu option 621 and the controller 180 displays sub menus related to the selected Send Text menu option 621 as shown in the display screen 620.

Also, as shown in step (S242) in the lower portion of FIG. 9, the controller 180 can also immediately execute a function when only a single menu is determined to be higher than the predetermined probability rate. That is, the controller 180 displays the information related to the text sending as shown in the display screen 620 immediately without the user having to select the Send Text menu option 621 when the Send Text menu option 621 is determined to be the only menu that has a higher recognition rate or probability than a predetermined threshold.

Further, as discussed above with respect to FIG. 6B, when a specific menu is selected or executed through a voice command or touch input according to an operation state or mode (e.g., a mode for indicating a voice recognition function), the controller 180 can also output balloon-shaped help information related to the sub menus to the user in a voice or text format. In addition, the user can set the operation mode for outputting the help using appropriate menu options provided in environment setting menus. Accordingly, a user can operate the mobile terminal of the present invention without needing or having a high level of skill. That is, many older people may not be experienced in operating the plurality of different menus provided with terminal. However, with the mobile terminal of the present invention, a user who is generally not familiar with the intricacies of the user interfaces provided with the mobile terminal can easily operate the mobile terminal.

In addition, when the controller 180 recognizes the voice command to have a plurality of meanings (i.e., when a natural language voice command (e.g., I want to send text messages) does not include a precise menu name such as when a menu is included in a 'send message' category but does not have a precise name among 'send photo', 'send mail', and 'outbox'), the controller 180 displays a plurality of menus having a recognition rate more than a certain value (e.g. 80%).

Figure 10:
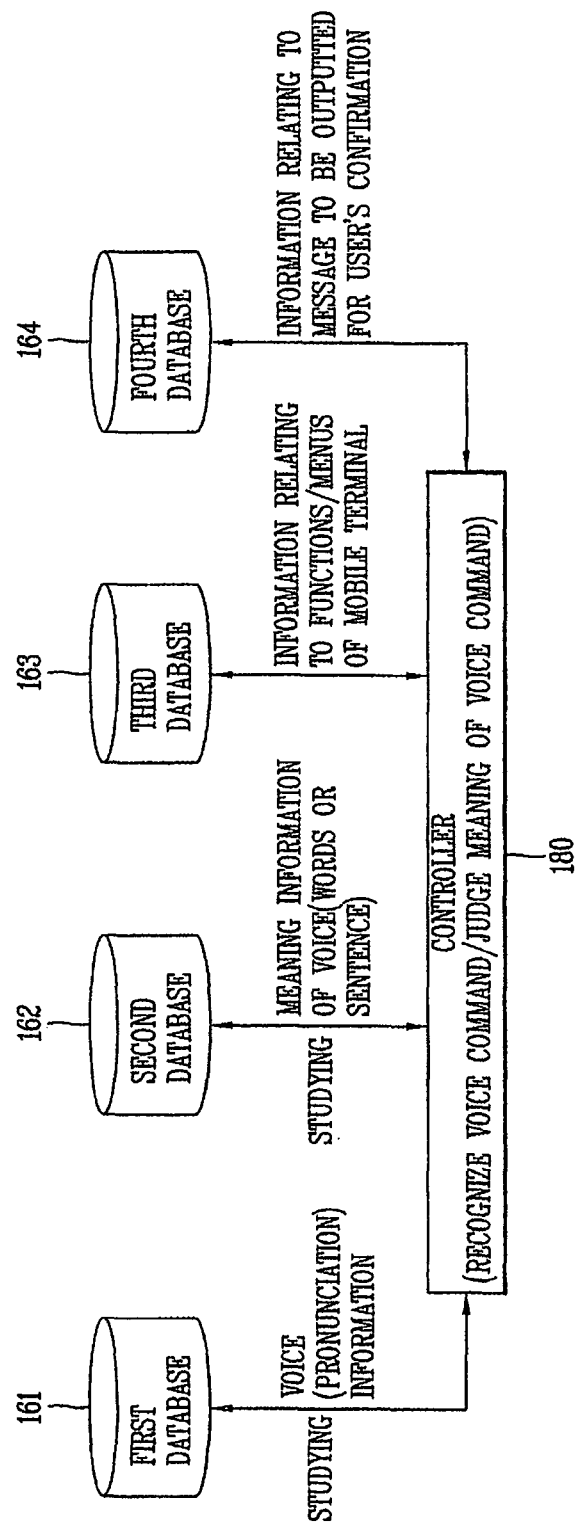
FIG. 10 is an overview of a configuration of databases used as a reference for voice command recognition of a mobile terminal according to one embodiment of the present invention.

Next, FIG. 10 is an overview showing a plurality of databases used by the controller 180 for recognizing a voice command of a mobile terminal according to an embodiment of the present invention. In this embodiment, the databases store information that the controller 180 uses to judge a meaning of a voice command, and may be any number of databases according to information features. Further, the respective databases configured according to information features may be updated through a continuous learning process under control of the controller 180.

For example, the learning process attempts to match a user's voice with a corresponding word. For example, when a word "waiting" pronounced by a user is misunderstood as a word "eighteen", the user corrects the word "eighteen" into "waiting". Accordingly, the same pronunciation to be subsequently input by the user is made to be recognized as "waiting."

As shown in FIG. 10, the respective databases according to information features include a first database 161, a second database 162, a third database 163, and a fourth database 164. In this embodiment, the first database 161 stores voice information for recognizing a voice input through the microphone in units of phonemes or syllables, or morphemes. The second database 162 stores information (e.g., grammar, pronunciation precision, sentence structure, etc.) for judging an entire meaning of a voice command based on the recognized voice information. The third database 163 stores information relating to menus for functions or services of the mobile terminal 100, and the fourth database 164 stores a message or voice information to be output from the mobile terminal so as to receive a user's confirmation about the judged meaning of the voice command In addition, the third database 163 may be specified into information relating to menus of a specific category according to a domain preset for voice command recognition. Also, the respective database may store sound (pronunciation) information, and phonemes, syllable, morphemes, words, keywords, or sentences corresponding to the pronunciation information. Accordingly, the controller 180 can determine or judge the meaning of a voice command by using at least one of the plurality of databases 161 to 164, and execute menus relating to functions or services corresponding to the judged meaning of the voice command. Also, the present invention can display an operation state or mode having the voice command recognition function or STT function applied thereto by using a specific shape of indicator or icon. So, upon the output of the indicator or icon, the user can be notified through specific sound or voice.

Descriptions of the voice recognition method in a mobile terminal and the method for activating a voice recognition function have been given in detail. Hereinafter, descriptions of methods for enhancing a recognition rate and a voice recognition speed of the voice recognition function by, when a voice is converted into a text using the Speech To Text (STT) function, inputting a first character of a word to be voice-inputted by using a keypad will be given in detail.

Figure 11:
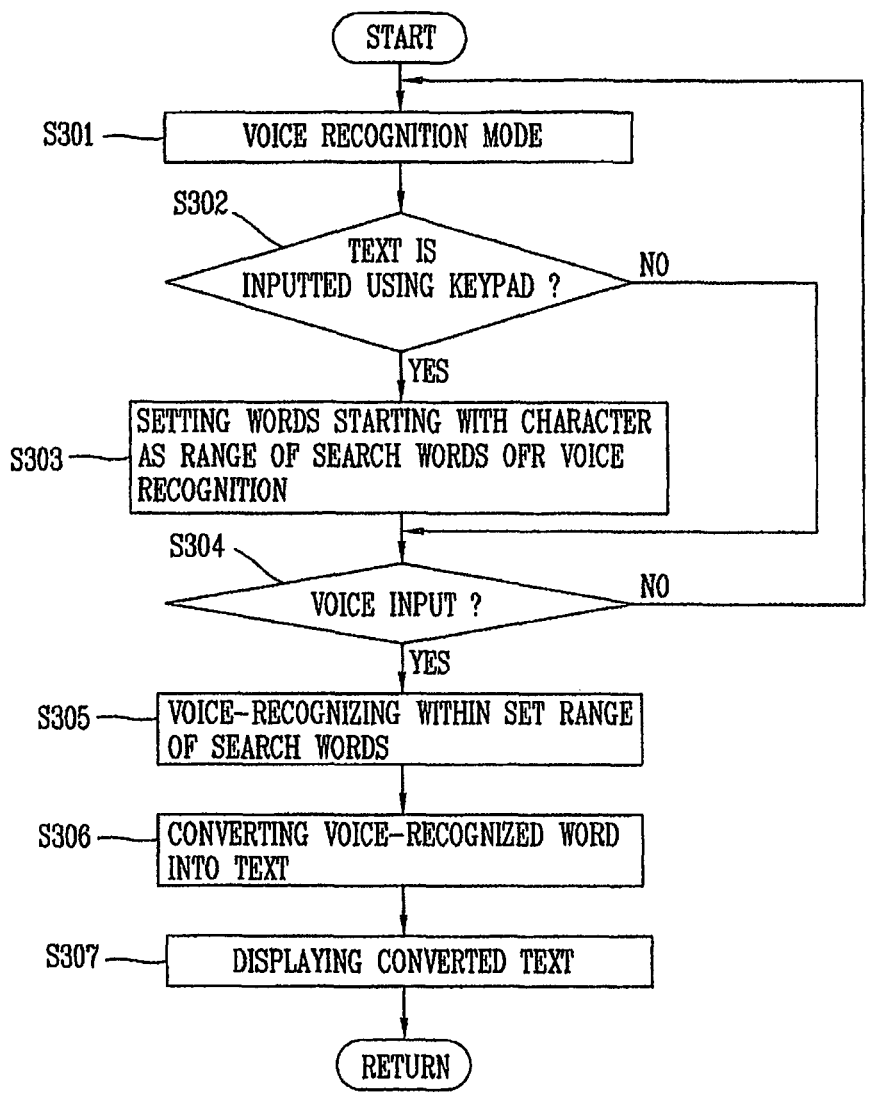
FIG. 11 is a flowchart illustrating a voice recognition method for a mobile terminal through a key input according to one embodiment of the present invention.

FIG. 11 is a flowchart illustrating a voice recognition method for a mobile terminal through a key input according to one embodiment of the present invention.

It is assumed that a user has executed a text message writing function in this embodiment. It is also assumed that a voice is converted into a text by using the STT function in the voice recognition mode, and then the converted text is inputted as contents of a text message.

The text message writing function may include a Short Message Service (SMS), a Multimedia Message Service (MMS), E-mails, memos, schedules, to-do list functions, and the like.

The Speech To Text (STT) function in this embodiment may include at least two options. A user may select one of the two options for the text message writing function, and the options may be selected before the text message writing function is executed or while the text message writing function is being executed.

The first option is an option to input the contents of a message by voice only, and corresponds to the general STT function, therefore detailed explanations therefor are omitted.

The second option is an option to input the contents of a message by combining a voice input and a key input. In this embodiment, descriptions of a case the second option is selected will be given in detail. Hereinafter, it is assumed that the user has selected the second option.

If the text message writing function is executed after the second option has been selected, the controller 180 may output help information (or a guidance message) about a method of inputting a text message. The help information may be outputted by voice or text messages. For instance, the help information, stating that 'for more accurate voice recognition, please input a first character of a word to be inputted by voice using a keypad' may be outputted.

In addition, if the text message writing function is executed after the second option has been selected, the controller 180 may display a keypad on the display module 151. Hereinafter, the keypad displayed on the display module 151 is referred to as the software keypad.

The software keypad may be displayed in the form of a QWERTY keyboard layout, or in the form of a keyboard layout where a plurality of characters are allocated to a single key. In addition, the keypad may include a character keyboard, a numeric keyboard and a symbolic keyboard.

The user may use a hardware keypad 215 as well as the software keypad to input a first character of a word to be inputted by voice. For instance, if the user is to input the word 'waiting' by voice, the user may input the first character 'w' of the word using the software keypad or the hardware keypad.

The first character follows the character systems of each language.

Once the character is inputted using the keypad in the voice recognition mode (S301), the controller 180 sets the words starting with the first character as a range of search words for voice recognition (S303).

Here, the range of search word is not limited to the words, but may be set to be a phrase, a sentence, and the like. That is, the specific character inputted through the keypad may be the first character of a common phrase or sentence.

If the voice is inputted (S304), voice recognition is performed within the set range of the search words (S305). The mobile terminal according to the present invention would receive the first character for voice recognition through the keypad before the voice input is performed, thereby enhancing a voice recognition speed and a voice recognition rate as well as reducing consumption of resources of the mobile terminal required for the voice recognition.

After the voice recognition is completed, the controller 180 converts the recognized voice into a text (S306). Then, the controller 180 displays the converted text on a text message writing screen (S307).

Figure 12:
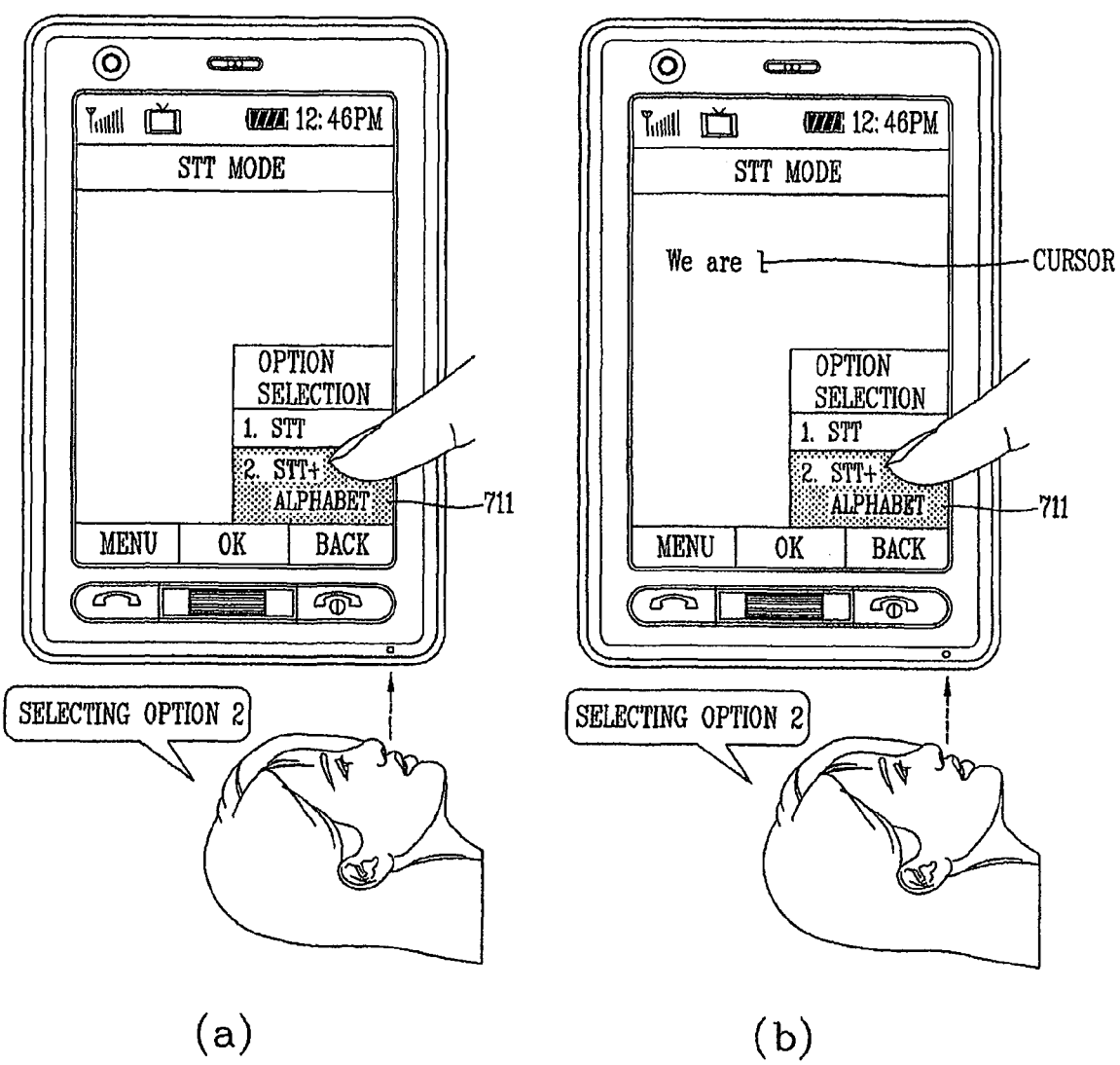
FIG. 12 is an overview illustrating a method for setting options for a text message writing function in a mobile terminal according to one embodiment of the present invention.

FIG. 12 is an overview illustrating a method for setting options for a text message writing function in a mobile terminal according to one embodiment of the present invention.

If a specific key manipulation, touch or a voice command is received from the user, the controller 180 may output an option setting screen for the text message writing function.

Options for the text message writing function may be selected before the text message writing function is executed as shown in FIG. 12(*a*), or may be selected while the text message writing function is being executed as shown in FIG. 12(*b*).

As describe above, the first option (e.g., 1.STT) is the option to input the contents of a message by voice only, and the second option (e.g., 2.STT+alphabet) is the option to input the contents of a message by combining the voice input and the key input.

The controller 180 may receive an inputting of one (e.g., option 2) selected among the options through the voice command, the touch or other input means by the user.

Figure 13:
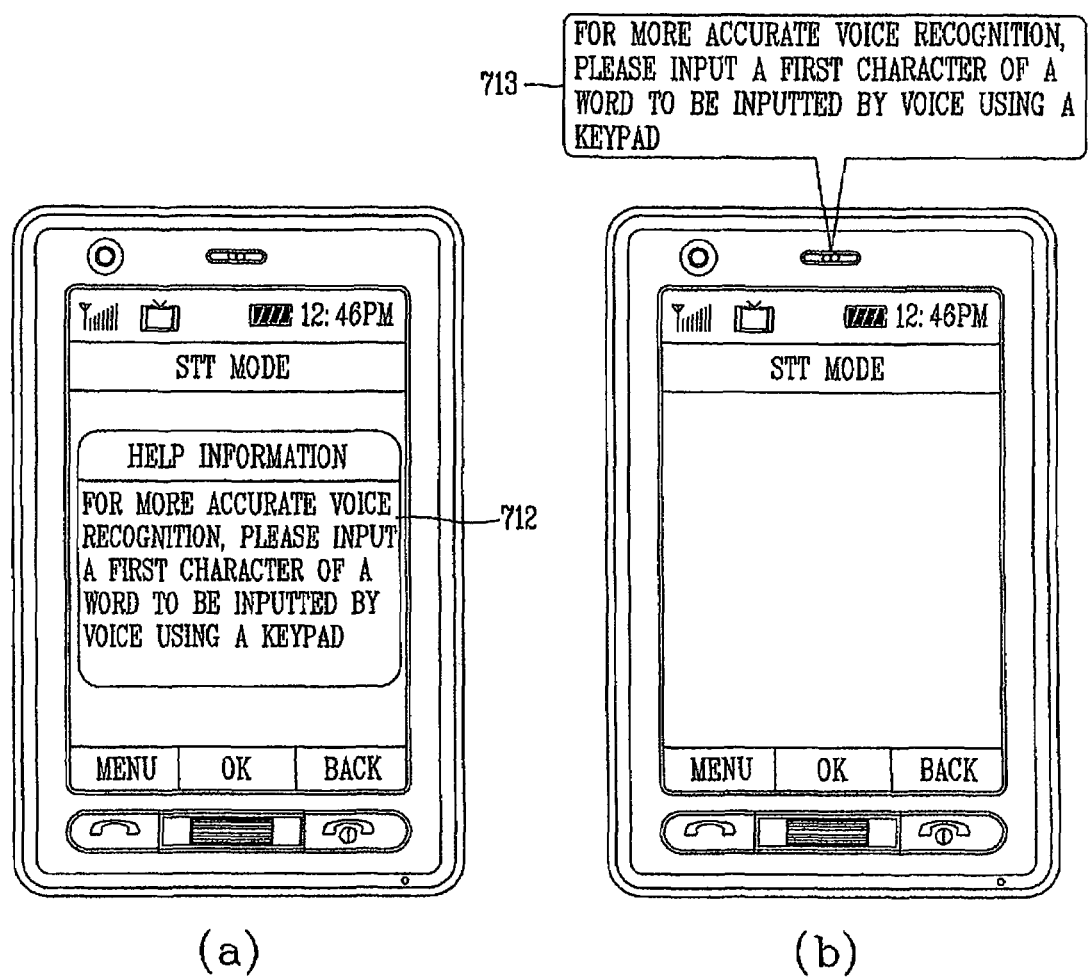
FIG. 13 is an overview illustrating a method for outputting help information when a text message writing function is being executed in a mobile terminal according to one embodiment of the present invention.

FIG. 13 is an overview illustrating a method for outputting help information when a text message writing function is being executed in a mobile terminal according to one embodiment of the present invention. Hereinafter, it is assumed that the second option is selected among the options.

If the second option 711 of FIG. 12 is selected among the options, the controller 180 may use the second option to output help information serving to guide a text message writing method.

The help information may be outputted in the form of a text message 712 as shown in FIG. 13(a), or by voice 713 as shown in FIG. 13(b). The contents of the help information may differ according to the type of the mobile terminal. However, the contents of the help information are intended to contain information which allows a user (beginner) initially using the STT function to write a text message by combining the key input and the voice input.

Figure 14:
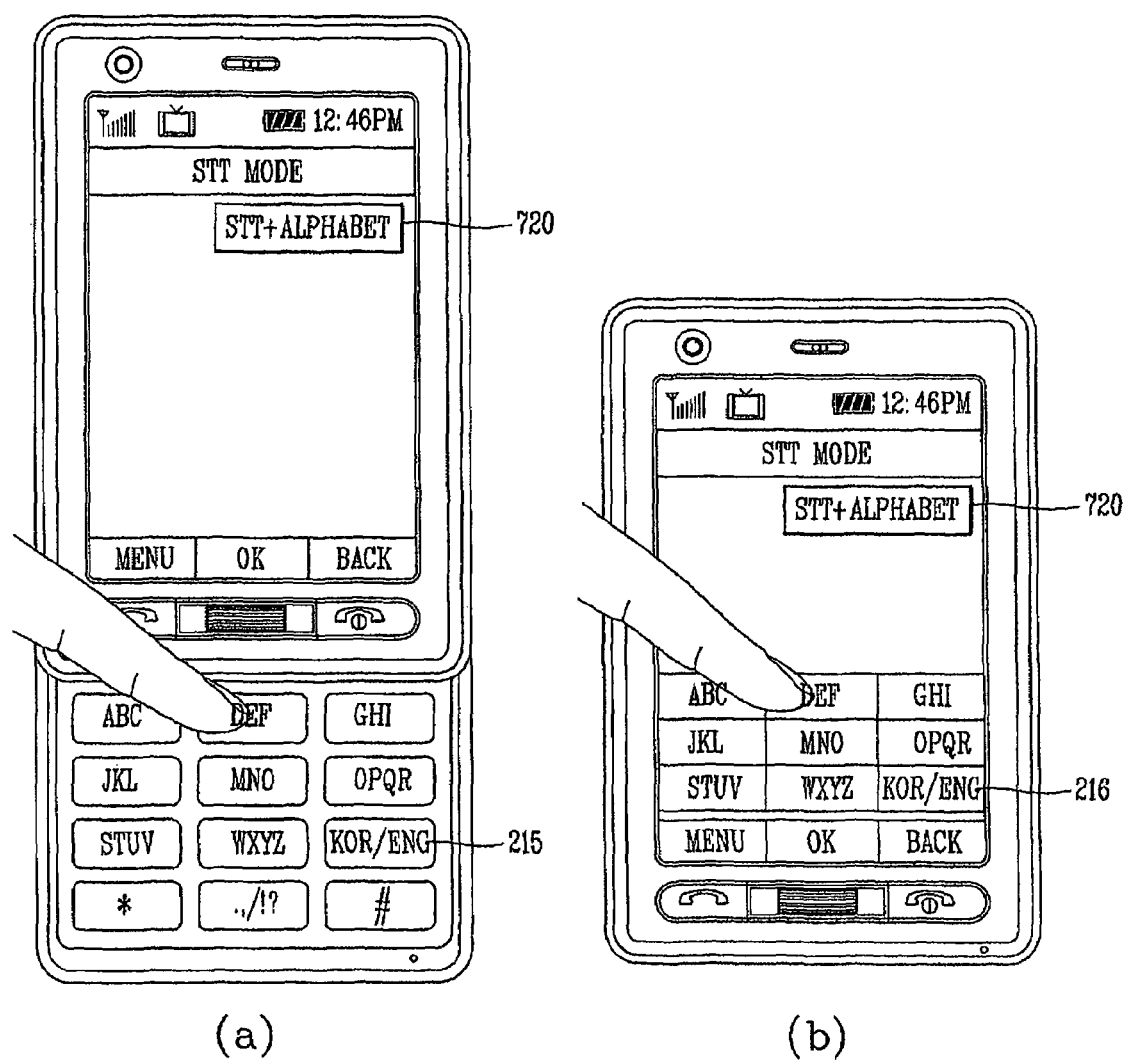
FIG. 14 is an overview illustrating a method for writing a text message by combining a key input and a voice input in a mobile terminal according to one embodiment of the present invention.

FIG. 14 is an overview illustrating a method for writing a text message by combining a key input and a voice input in a mobile terminal according to one embodiment of the present invention.

Once the second option 711 of FIG. 12 is selected among the two options, the controller 180 may display indicator information (720) for the selected second option on the display module 151. That is, the indicator information indicating that the text message can be written by combining the key input and the voice input is displayed. The indicator information may be displayed as a specific icon, an image or a text, and also be highlighted with a specific color.

Here, the user, as shown in FIG. 14(a), may input a character using the hardware keypad 215. If the hardware keypad 215 is not provided in the mobile terminal 100, the controller 180, as shown in FIG. 14(b), may display the software keypad 216 on the display module 151. Accordingly, the user may write the text message by combining the software keypad 216 and the voice input.

The software keypad 216 may be displayed in the form of the QWERTY keyboard layout, or in the form of a keyboard layout where a plurality of characters are allocated to a single key as shown in FIG. 14(b). The software keypad 216 may automatically display a keypad in an appropriate form according to the width of the display module 151.

If the user inputs a text message by using the keypad in which the plurality of characters are allocated to the single key, the present invention may selectively be applied to one of a scheme in which characters allocated to the key are sequentially inputted each time the key is inputted (i.e., a single character input scheme), and a scheme in which all characters allocated to the key are inputted (i.e., a plural character input scheme).

Here, the inputting signifies the inputting of a key corresponding to the first character of the word to be inputted by voice so as to be recognized by the controller 180. However, it does not signify that the characters corresponding to the inputted key are inputted as the contents of the text message. Here, in order to allow the user to check the inputted characters, the controller 180 may temporarily display the inputted characters on a certain area of the display module 151.

For instance, if the user inputs a specific character (e.g., D) using the QWERTY keypad where one character is allocated to one key and then inputs voice, the controller 180 performs voice recognition based on the words having the first character starting with the letter 'D.' In addition, if voice is inputted after the key allocated to a plurality of characters 'D, E and F' is inputted, the controller 180 performs voice recognition based on the words having the first character starting with one of the letters 'D, E and F.'

Meanwhile, the above embodiment has described a case of inputting, using the keypad, only the first character of the word to be inputted by voice. However, the user may consecutively input characters subsequent to a second character by using the keypad. The greater the number of characters inputted through the keypad, more enhanced are the voice recognition rate and voice recognition speed by the controller 180.

Figure 15A:
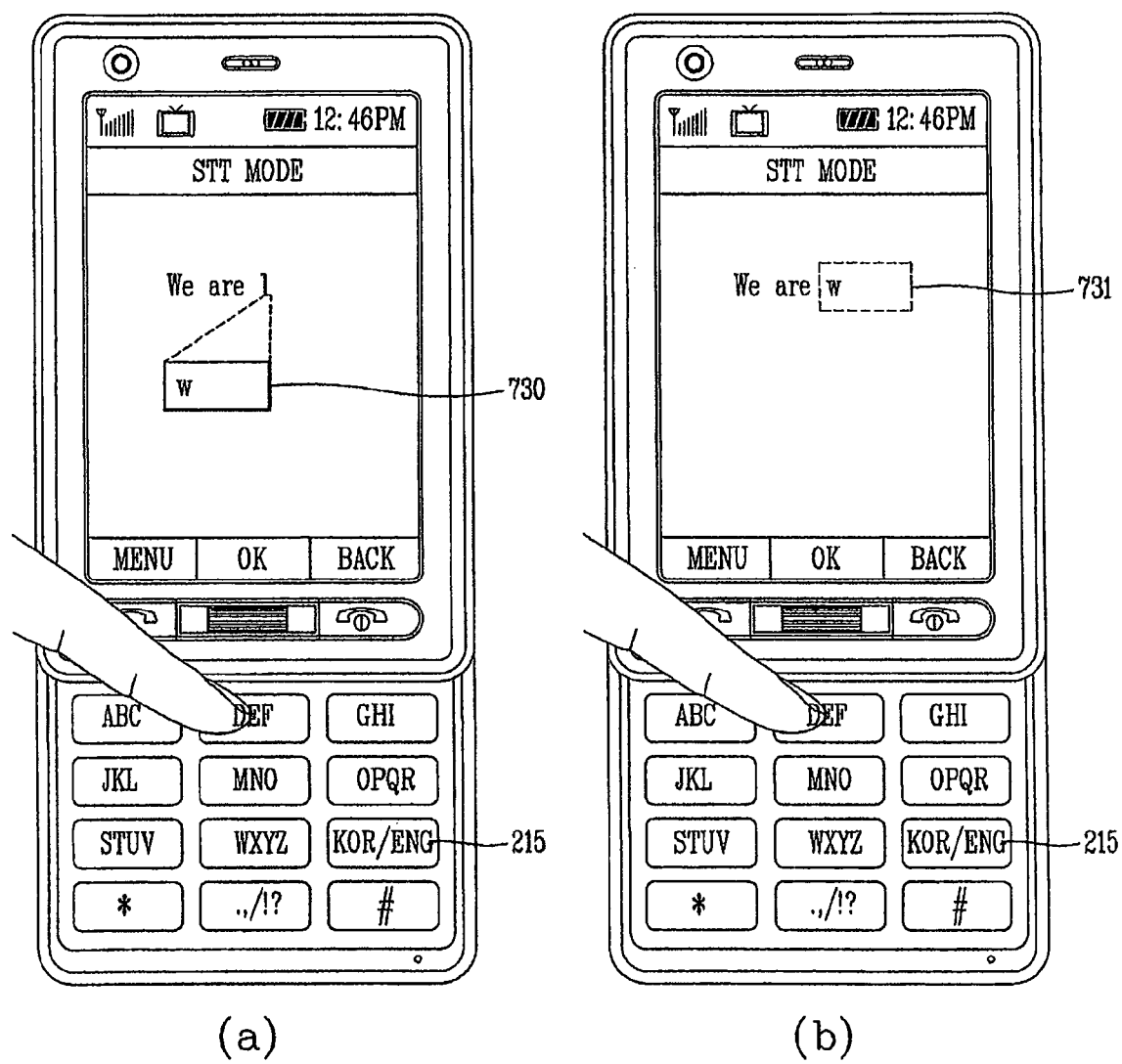
Figure 15C:
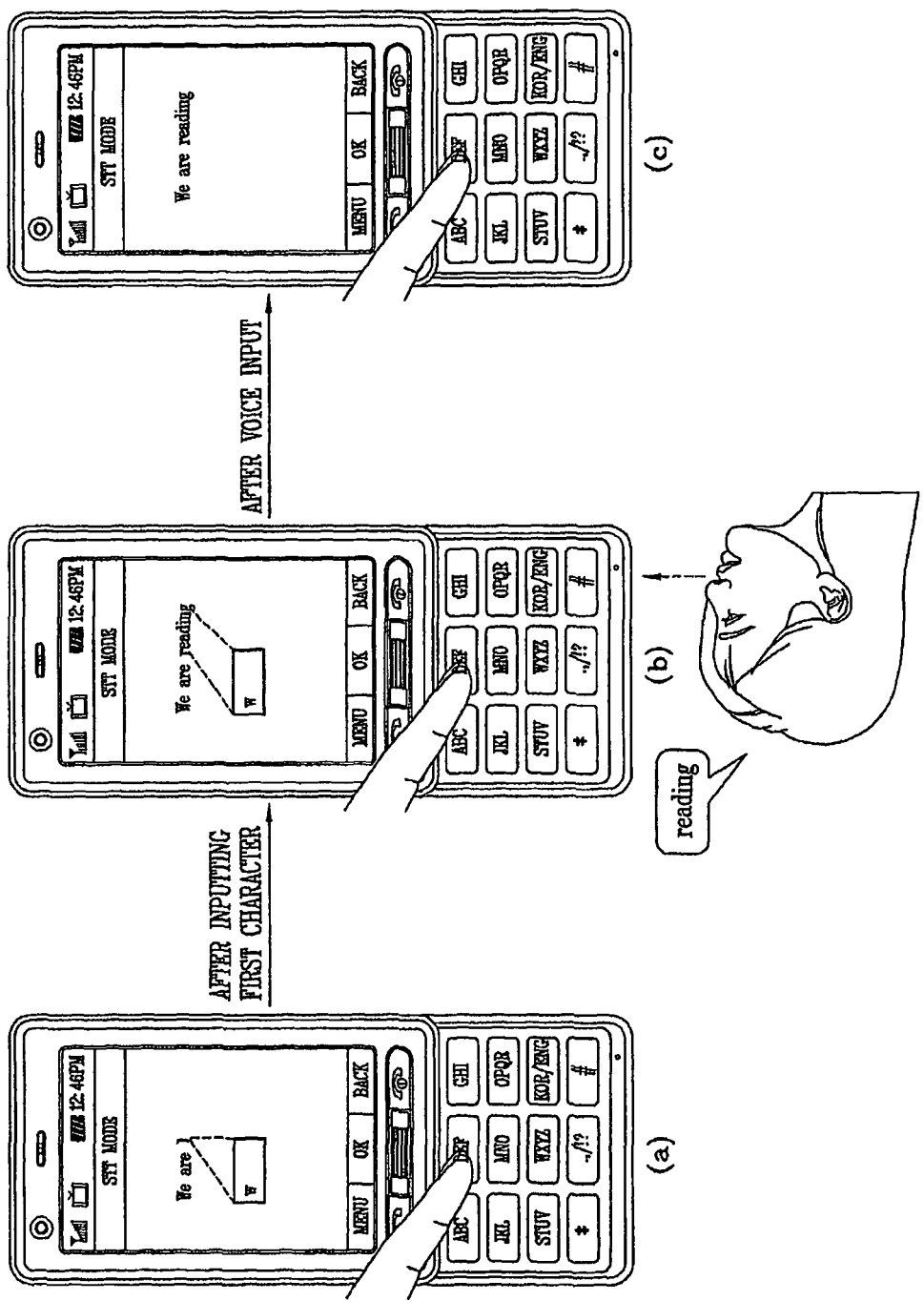

FIGS. 15A to 15C are overviews illustrating a method for displaying a text inputted through a key in a mobile terminal when a text message is written according to one embodiment of the present invention.

When a text message is written by a combination of the key input and the voice input, the controller 180 may display characters corresponding to the inputted keys on one area (730) of the text message writing screen as shown in FIG. 15A (a), or may display the same on one area (731) within the sentence currently being written as shown in FIG. 15A (b).

If a single character is allocated to one key, the single character is displayed, and if a plurality of characters are allocated to one key, the plurality of characters may all be displayed.

In addition, if a certain character is inputted by using the keypad when voice is currently being inputted, the controller 180 may recognize the certain character as the first character of the word to be inputted by voice.

The character having been inputted using the keypad may be cleared on the screen when the inputting of the word starting with the character is completed. In addition, even though the word starting with the inputted character is not completely inputted, once the inputting of a word is completed, the character having been inputted using the keypad may be cleared on the screen.

For instance, it is assumed that a user has inputted a first character 'w' of a word by using a keypad in order to input the word 'waiting' by voice. If the user inputs the character 'w' through the keypad as shown in FIG. 15B (a) and speaks the word 'waiting' as shown in (b), the character 'w' displayed on the screen may be cleared as shown in (c). After the user has inputted the character 'w' by using the keypad as shown in FIG. 15C (a), even if the user speaks the word 'reading,' which does not start with the character 'w,' as shown in (b), the character 'w' displayed on the screen may be cleared as shown in (c). Meanwhile, the environment setting option may be configured such that after the character 'w' is inputted using the keypad, it is not cleared on the screen until the word starting with the character 'w' is spoken. In this case, the user should directly remove the character 'w' and accurately re-input the first character of the word to be inputted by voice.

Figure 16:
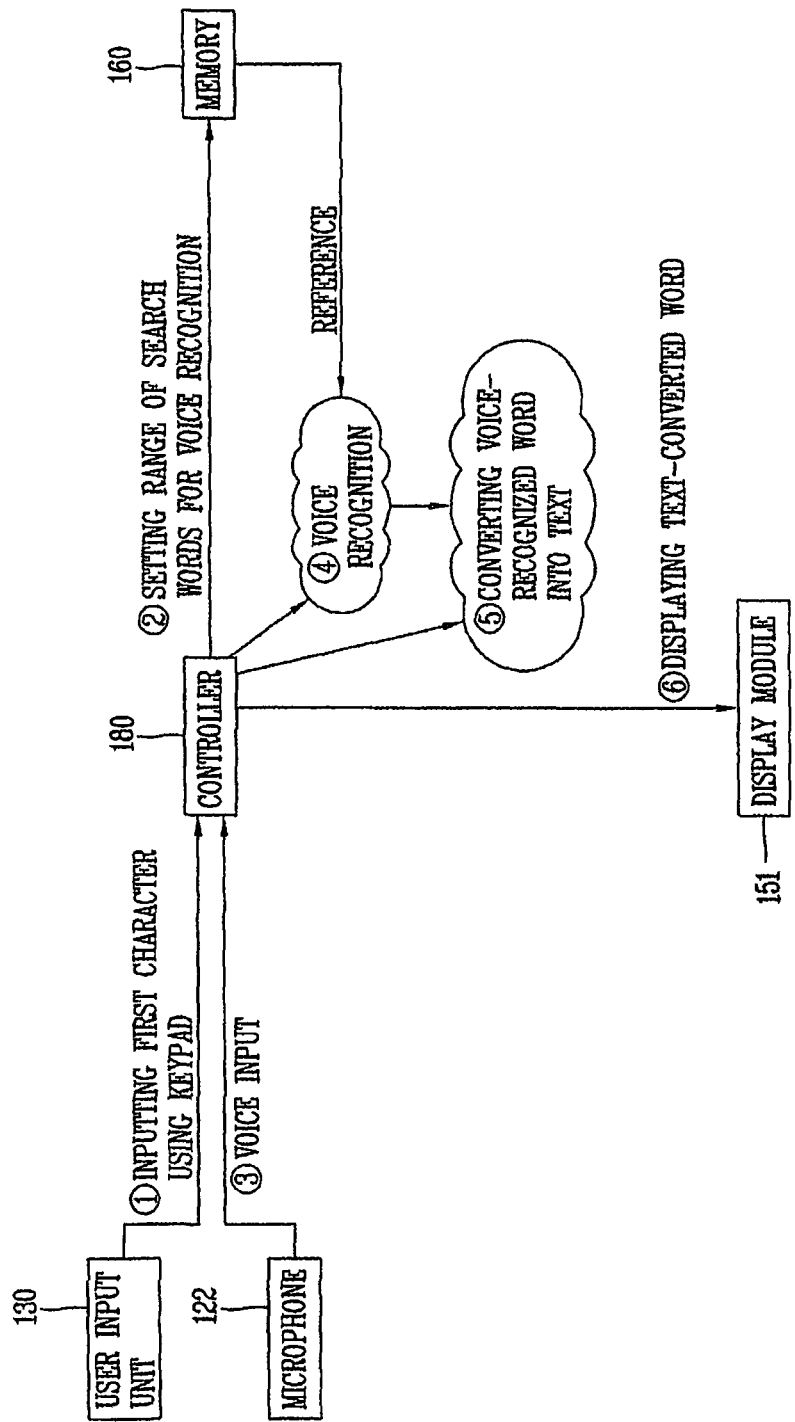
FIG. 16 is an overview illustrating a process of writing a text message by a combination of a key input and a voice input in a mobile terminal according to one embodiment of the present invention.

FIG. 16 is an overview illustrating a process of writing a text message by a combination of a key input and a voice input in a mobile terminal according to one embodiment of the present invention.

According to the present invention, when the text message is written by combination of the key input and the voice input, if the user inputs a specific character by using the software keypad or the hardware keypad in a state the text message writing screen is displayed (①), the controller 180 may set the words starting with the specific character as the range of the search words for the voice recognition (②). Here, the controller 180 may display the specific character inputted through the keypad according to the preset environment setting option.

Further, if the user inputs the specific word by voice (③), the controller 180 may recognize the inputted voice within the set range of the search words (④), convert the recognized voice into a text (⑤), and then display the converted text on the display module 151 (⑥).

The method according to each embodiment of the present invention can be implemented in a medium having a program recorded as computer-readable codes. The computer-readable medium may include all types of recording apparatuses each storing data which is readable by a computer system. Examples of such computer-readable media may include ROM, RAM, CD-ROM, magnetic tape, floppy disk, optical data storage element and the like. The computer can include the controller 180 of the mobile terminal 100.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a display unit;
an input unit configured to input a voice command; and
a controller configured to:
  start activation of a voice recognition function based on a button input or a touch input;
  determine a meaning of the voice command by analyzing a context and content of the voice command within a specified domain of database accessed by the mobile terminal, wherein the specified domain of database comprises a portion of database associated with a menu or sub-menus of the menu currently displayed on the display unit;
  execute a text message writing function if the voice command corresponds to execution of the text message writing function; and
  input contents of a message by using a speech to text (STT) function,
  wherein the contents of the message is inputted by combining a voice input and a key input if the STT function is selected while the text message writing function is being executed.

2. The mobile terminal of claim 1, wherein the voice cognition function is activated when a particular button or portion of a touch screen is touched.

3. The mobile terminal of claim 1, wherein the determining step is updated through a learning process of trials and errors.

4. The mobile terminal of claim 1, wherein the specified domain further comprises a domain related to a specific application currently displayed on the display unit when the voice command is inputted.

5. The mobile terminal of claim 1, wherein the controller outputs a result value corresponding to the meaning of the voice command in a form of a text message or a voice.

6. The mobile terminal of claim 5, wherein the controller is configured to make a request to a user whether to execute a function corresponding to the output result value, when the voice command is judged to have a low recognition rate or a plurality of meanings, and the controller outputs a plurality of menus relating to the respective meanings.

7. The mobile terminal of claim 5, wherein the controller is configured to output a plurality of menus relating to respective meanings and execute a specific menu selected by a user.

8. The mobile terminal of claim 1, wherein the text message writing function includes at least one of a short message service (SMS) function, a multimedia message service (MMS) function, an e-mail function, a memo function, a schedule function or a to-do list function.

9. A text input method of a mobile terminal, the text input method comprising:
activating a voice recognition function based on a button input or a touch input;
specifying a domain of a database that is referred to for voice recognition into a domain related to an application currently displayed on a display;
receiving a voice command related to the displayed application;
analyzing a context and content of the voice command based on the specified domain of the database and recognizing a meaning of the voice command;
outputting a result corresponding to the recognized meaning;
executing a text message writing function as the application if the voice command corresponds to execution of the text message writing function; and
inputting contents of a message by using a speech to text (STT) function, wherein the contents of the message is inputted by combining a voice input and a key input if the STT function is selected while the text message writing function is being executed.

10. The text input method of claim 9, wherein the voice recognition function is automatically terminated when a predetermined time period elapses.

11. The text input method of claim 9, wherein the button input is an input of a hardware button or a soft touch button.

12. The text input method of claim 9, wherein the voice recognition function is activated by one of a user sound, a sound effect, short or long-range wireless signal and a user's gesture.

13. The text input method of claim 9, wherein analyzing the context and content of the voice command is updated through a learning process.

14. The text input method of claim 9, wherein the result corresponding to the recognized meaning is outputted in a form of a text message or a voice.

15. The text input method of claim 9, further comprising:
requesting a user whether to execute a specific function corresponding to the output result, wherein the specific function includes a saving function or a send function; and
executing a corresponding function according to the user's response.

16. The text input method of claim 9, wherein the text message writing function includes a short message service (SMS) function, a multimedia message service (MMS) function, an e-mail function, a memo function, a schedule function or a to-do list function.

17. A mobile terminal, comprising:
a display unit;
an input unit configured to input a voice command; and
a controller configured to:
- activate a voice recognition function based on a button input or a touch input,
- specify a domain of a database that is referred to for voice recognition into a domain related to an application currently displayed on the display,
- receive a voice command related to the displayed application,
- analyze a context and content of the voice command based on the specified domain of the database and recognize a meaning of the voice command,
- output a result corresponding to the recognized meaning,
- execute a text message writing function as the application if the voice command corresponds to execution of the text message writing function; and
input contents of a message by using a speech to text (STT) function, wherein the contents of a message is inputted by combining a voice input and a key input if the STT function is selected while the text message writing function is being executed.

18. The mobile terminal of claim 17, wherein the voice recognition function is activated when a particular button or portion of a touch screen is touched.

19. The mobile terminal of claim 17, wherein the application includes at least one of a text message, an e-mail, a call, a menu, or multimedia content.

20. The mobile terminal of claim 17, wherein information related to the domain of the database used as a reference for the application is updated through a learning process.

21. The mobile terminal of claim 17, wherein the controller specifies a domain of a database that is referred to for voice recognition into a domain related to the application currently displayed on the display when the voice command is inputted.

22. The mobile terminal of claim 17, wherein the controller outputs the result corresponding to the recognized meaning in a form of a text message or a voice.

23. The mobile terminal of claim 17, wherein the controller is configured to make a request to a user whether to execute a function corresponding to the output result, when the voice command is recognized to have a low recognition rate or a plurality of meanings, and the controller outputs a plurality of menus relating to the respective meanings.

24. The mobile terminal of claim 17, wherein the controller is configured to output a plurality of menus relating to the respective meanings and execute a specific menu selected by a user.

25. The mobile terminal of claim 17, wherein the text message writing function includes at least one of a short message service (SMS) function, a multimedia message service (MMS) function, an e-mail function, a memo function, a schedule function or a to-do list function.

* * * * *